US009850391B2

(12) United States Patent
Fukuoka et al.

(10) Patent No.: US 9,850,391 B2
(45) Date of Patent: Dec. 26, 2017

(54) INK, INK STORED CONTAINER, INKJET PRINTING METHOD, AND INKJET PRINTING DEVICE

(71) Applicants: Masayuki Fukuoka, Tokyo (JP); Shigeyuki Harada, Shizuoka (JP); Yoshiki Yanagawa, Shizuoka (JP); Takuya Yamazaki, Shizuoka (JP); Kazukiyo Nagai, Shizuoka (JP); Yuusuke Koizuka, Shizuoka (JP); Tomoyuki Shimada, Shizuoka (JP); Akiyoshi Sabu, Shizuoka (JP); Akihiko Matsuyama, Shizuoka (JP)

(72) Inventors: Masayuki Fukuoka, Tokyo (JP); Shigeyuki Harada, Shizuoka (JP); Yoshiki Yanagawa, Shizuoka (JP); Takuya Yamazaki, Shizuoka (JP); Kazukiyo Nagai, Shizuoka (JP); Yuusuke Koizuka, Shizuoka (JP); Tomoyuki Shimada, Shizuoka (JP); Akiyoshi Sabu, Shizuoka (JP); Akihiko Matsuyama, Shizuoka (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/259,676

(22) Filed: Sep. 8, 2016

(65) Prior Publication Data

US 2017/0073533 A1 Mar. 16, 2017

(30) Foreign Application Priority Data

Sep. 11, 2015 (JP) ................................. 2015-179184

(51) Int. Cl.
*C09D 11/104* (2014.01)
*C09D 11/322* (2014.01)

(52) U.S. Cl.
CPC .......... *C09D 11/104* (2013.01); *C09D 11/322* (2013.01)

(58) Field of Classification Search
CPC ..... C09D 11/322; C09D 11/326; B41J 2/2107
See application file for complete search history.

(56) References Cited

U.S. PATENT DOCUMENTS 7,001,935 B2 * 2/2006 Ohta ...................... C09D 11/40 523/160
7,241,332 B2 * 7/2007 Yoshizawa ............. C09D 11/40 106/31.47

(Continued)

FOREIGN PATENT DOCUMENTS

JP 2003-147243 5/2003
JP 2011-105866 6/2011

OTHER PUBLICATIONS

JP 2011-105866 Machine Translation : https://www4.j-platpat.inpit.go.jp/cgi-bin/tran_web_cgi_ejje?u=http://www4.j-platpat.inpit.go.jp/eng/translation—Retrieved Apr. 14, 2017.*

(Continued)

*Primary Examiner* — Manish S Shah
*Assistant Examiner* — John P Zimmermann
(74) *Attorney, Agent, or Firm* — Oblon, McClelland, Maier & Neustadt, L.L.P.

(57) ABSTRACT

Provided is an ink including: copolymer including at least one of structural unit of formula (1) and structural unit of formula (2); pigment having acid value of ≤15 μmol/g and represented by formula (3); water; and water-soluble organic solvent. In formula (1), $R_1$ represents hydrogen or methyl group. $L_1$ represents alkylene group including 2-18 carbon atoms. In formula (2), $R_1$ represents hydrogen or methyl group. $L_2$ represents single bond or —$(CH_2)n$-O— of which (Continued)

oxygen is bound with biphenyl. n represents integer of 2 through 18. In formula (3), $R^1$ represents any one of hydrogen, halogen, alkyl group including 1-4 carbon atoms, alkoxy group including 1-4 carbon atoms, hydroxy, nitro, and alkyl substituted or unsubstituted amino group including 1-4 carbon atoms. n represents integer of 1 through 5. When n is a plural number, $R^1$ may be identical or different. $R^2$, $R^3$, and $R^4$ represent alkyl group including 1-4 carbon atoms.

Formula (1)

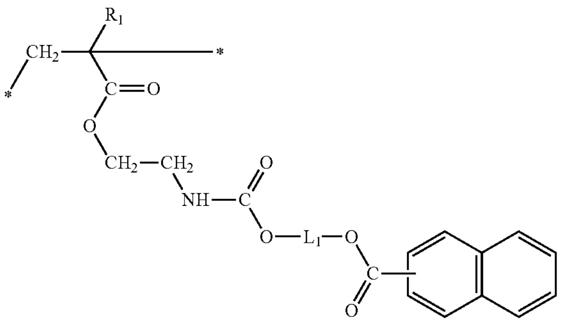

Formula (2)

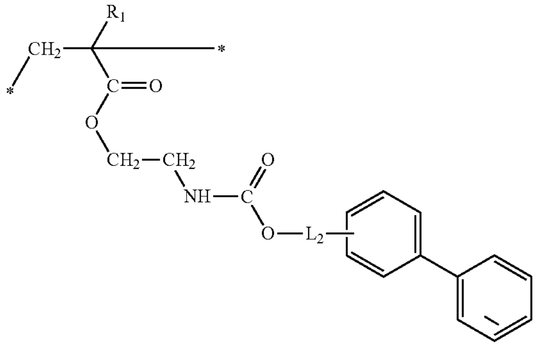

Formula (3)

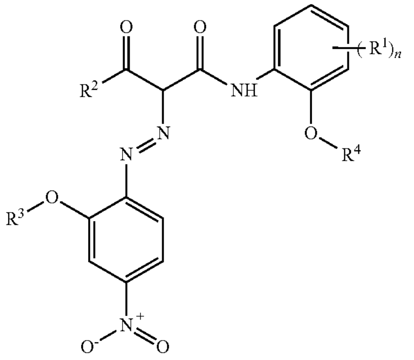

15 Claims, 2 Drawing Sheets

(56) References Cited

U.S. PATENT DOCUMENTS

| | | | | |
|---|---|---|---|---|
| 8,960,885 | B2 | 2/2015 | Katoh et al. | |
| 8,974,895 | B2 | 3/2015 | Naruse et al. | |
| 8,998,400 | B2 | 4/2015 | Harada et al. | |
| 9,034,091 | B2 | 5/2015 | Matsuyama et al. | |
| 9,217,089 | B2 | 12/2015 | Nagai et al. | |
| 9,234,110 | B2 | 1/2016 | Katoh et al. | |
| 2002/0075369 | A1* | 6/2002 | Ota | C09B 67/0002 347/100 |
| 2009/0108241 | A1* | 4/2009 | Ogura | G03F 7/033 252/586 |
| 2009/0131577 | A1* | 5/2009 | Kato | C08F 20/30 524/548 |
| 2009/0192261 | A1* | 7/2009 | Anton | C09D 11/326 524/555 |
| 2014/0066550 | A1* | 3/2014 | Shigemori | C09D 11/326 524/90 |
| 2014/0072779 | A1 | 3/2014 | Matsuyama et al. | |
| 2014/0120331 | A1 | 5/2014 | Koizuka et al. | |
| 2014/0141209 | A1 | 5/2014 | Koizuka et al. | |
| 2015/0064418 | A1 | 3/2015 | Matsuyama et al. | |
| 2015/0064425 | A1 | 3/2015 | Matsuyama et al. | |
| 2015/0109382 | A1 | 4/2015 | Naruse et al. | |
| 2015/0116421 | A1 | 4/2015 | Nonogaki et al. | |
| 2015/0247049 | A1 | 9/2015 | Matsuyama et al. | |
| 2015/0252203 | A1 | 9/2015 | Matsuyama et al. | |
| 2015/0259555 | A1 | 9/2015 | Katoh et al. | |
| 2015/0291817 | A1 | 10/2015 | Katoh et al. | |
| 2015/0307734 | A1 | 10/2015 | Nonogaki et al. | |
| 2015/0376425 | A1 | 12/2015 | Hakiri et al. | |
| 2016/0017075 | A1 | 1/2016 | Harada et al. | |
| 2016/0032037 | A1 | 2/2016 | Harada et al. | |
| 2016/0075892 | A1 | 3/2016 | Harada et al. | |
| 2016/0102162 | A1 | 4/2016 | Harada et al. | |
| 2016/0130452 | A1 | 5/2016 | Katoh et al. | |
| 2016/0168292 | A1 | 6/2016 | Fukuoka et al. | |

OTHER PUBLICATIONS

U.S. Appl. No. 15/001,829, filed Jan. 20, 2016.

* cited by examiner

INK, INK STORED CONTAINER, INKJET PRINTING METHOD, AND INKJET PRINTING DEVICE

CROSS-REFERENCE TO RELATED APPLICATIONS

The present application claims priority under 35 U.S.C. §119 to Japanese Patent Application No. 2015-179184, filed Sep. 11, 2015. The contents of which are incorporated herein by reference in their entirety.

BACKGROUND OF THE INVENTION

Field of the Invention

The present disclosure relates to an ink, an ink stored container, an inkjet printing method, and an inkjet printing device.

Description of the Related Art

Compared with other printing methods, inkjet printing methods have advantages that the methods have simple processes, can be easily accommodated to full-color operations, and can provide high-resolution images even when used on apparatuses having simple configurations. These advantages are spreading the inkjet printing methods to personal and office use and commercial printing and industrial printing fields. In the inkjet printing methods, water-based ink compositions using a water-soluble dye as a coloring material are mainly used. However, the water-based ink compositions have disadvantages of being poor in water resistance and light resistance. Hence, pigment inks using a water-insoluble pigment instead of a water-soluble dye are being developed.

For acceleration of a drying speed of an ink attached on a print medium as a measure for promoting high-speed printing, a means is taken to add a permeating agent such as a hydrophobic solvent in an ink to make water permeate a print medium and accelerate drying.

Hence, there is a need that dispersion stability of a pigment be satisfied in both of the following environments: a pigment dispersion in a water solvent; and an ink in a hydrophobic solvent.

If dispersion stability in a hydrophobic solvent is poor, pigment particles may aggregate and clog nozzle holes of an inkjet head to constitute a factor of no discharging.

Unlike water-based dye inks prepared by dissolving a dye in water, water-based pigment inks used in the inkjet printing methods or as writing materials have a need that the pigment that is insoluble in water be dispersed in water stably for a long term. Therefore, various pigment dispersants are being developed. For example, there is proposed a graft polymer including an aromatic ring in a side chain. It is said that use of this graft polymer as a pigment dispersant has ensured an ink storage stability at 70° C. for 3 days (see, e.g., Unexamined Japanese Patent Application Publication No. 2011-105866).

SUMMARY OF THE INVENTION

According to one aspect of the present disclosure, an ink includes a copolymer including at least one of a structural unit represented by general formula (1) below and a structural unit represented by general formula (2) below, a pigment having an acid value of 15 μmol/g or less and represented by general formula (3) below, water, and a water-soluble organic solvent.

General formula (1)

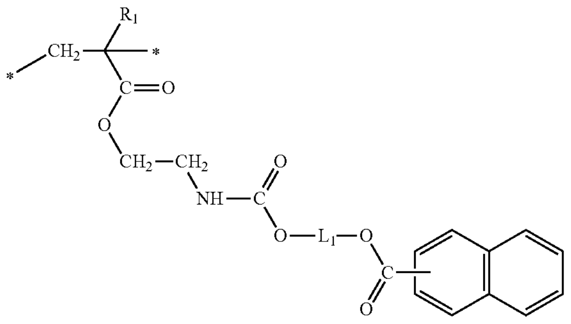

In the general formula (1), $R_1$ represents a hydrogen atom or a methyl group and $L_1$ represents an alkylene group including from 2 through 18 carbon atoms.

General formula (2)

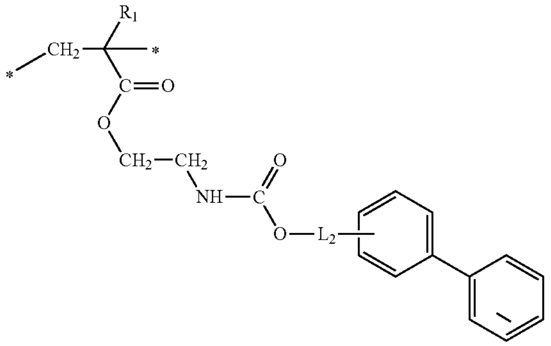

In the general formula (2), $R_1$ represents a hydrogen atom or a methyl group and $L_2$ represents a single bond or —$(CH_2)$n-O— of which oxygen atom is bound with biphenyl, where n represents an integer of from 2 through 18.

General formula (3)

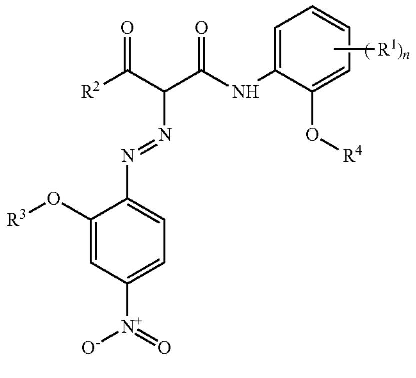

In the general formula (3), $R^1$ represents any one of a hydrogen atom, a halogen atom, an alkyl group including from 1 through 4 carbon atoms, an alkoxy group including from 1 through 4 carbon atoms, a hydroxy group, a nitro group, and an alkyl-substituted or unsubstituted amino group including from 1 through 4 carbon atoms. n represents an integer of from 1 through 5. When n is a plural number, $R^1$ may be identical or different. $R^2$, $R^3$, and $R^4$ represent an alkyl group including from 1 through 4 carbon atoms.

DESCRIPTION OF THE EMBODIMENTS (Ink)

Figure 1:
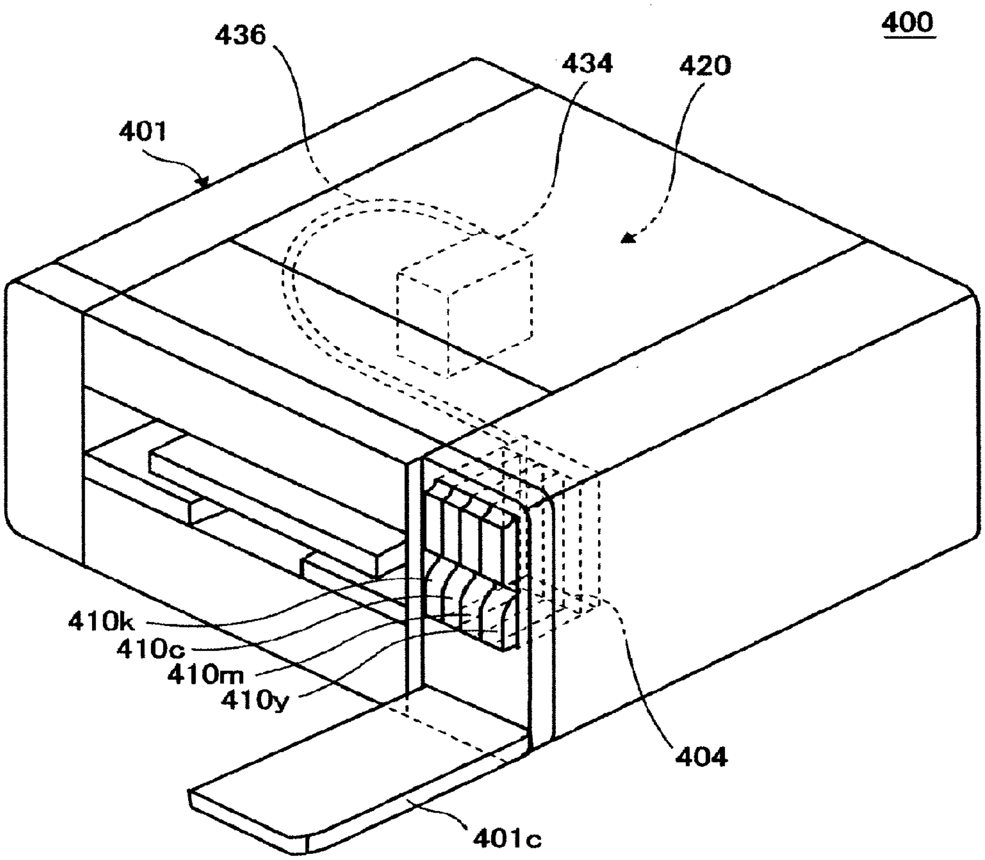
FIG. 1 is a view illustrating an example of a printing device using an ink according to an embodiment of the present disclosure.

An ink of the present disclosure includes a copolymer including at least one of a structural unit represented by general formula (1) below and a structural unit represented by general formula (2) below, a pigment having an acid value of 15 μmol/g or less and represented by general formula (3) below, water, and a water-soluble organic solvent.

General formula (1)

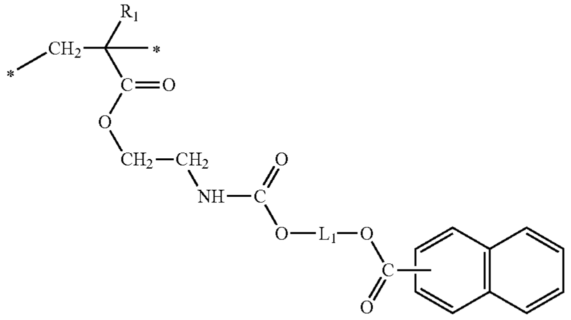

In the general formula (1), $R_1$ represents a hydrogen atom or a methyl group and $L_1$ represents an alkylene group including from 2 through 18 carbon atoms.

General formula (2)

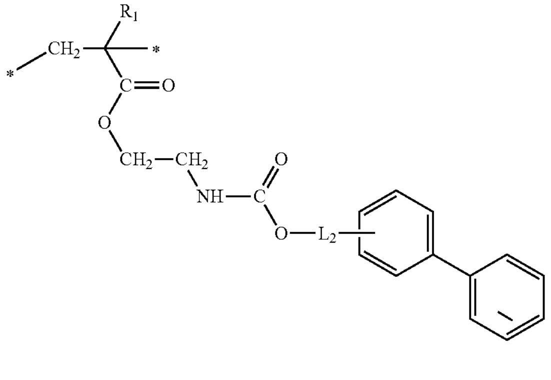

In the general formula (2), $R_1$ represents a hydrogen atom or a methyl group and $L_2$ represents a single bond or —$(CH_2)n$-O— of which oxygen atom is bound with biphenyl, where n represents an integer of from 2 through 18.

General formula (3)

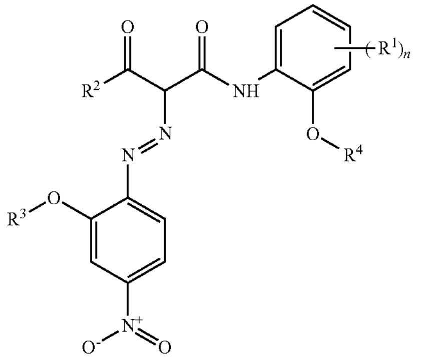

In the general formula (3), $R^1$ represents any one of a hydrogen atom, a halogen atom, an alkyl group including from 1 through 4 carbon atoms, an alkoxy group including from 1 through 4 carbon atoms, a hydroxy group, a nitro group, and an alkyl-substituted or unsubstituted amino group including from 1 through 4 carbon atoms. n represents an integer of from 1 through 5. When n is a plural number, $R^1$ may be identical or different. $R^2$, $R^3$, and $R^4$ represent an alkyl group including from 1 through 4 carbon atoms.

The present disclosure has an object to provide an ink having a favorable storage stability and an excellent discharging stability.

An ink of the present disclosure is excellent in storage stability and discharging stability.

<Ink>

The organic solvent, water, coloring material, and additives for use in the ink are described next.

An ink of the present disclosure can be used in a state of being stored in an ink stored container such as an ink cartridge configured to store an ink. The ink stored container can be used in a state of being attached in various inkjet printing devices in an attachable and detachable manner.

<Copolymer>

A content of the copolymer in the ink is not particularly limited and may be appropriately selected depending on the intended purpose when the copolymer is used as a pigment dispersant. However, a mass ratio (copolymer/pigment) is preferably from 0.10 through 0.5. When the content of the dispersant relative to the pigment as expressed in the mass ratio is 0.10 or greater, the pigment can be dispersed stably. When the content of the dispersant relative to the pigment is 0.5 or less, a favorable discharging stability can be obtained.

Any other dispersant may also be used in combination in an amount within a range in which the effect of the copolymer as the dispersant is not spoiled.

In the general formula (1), $R_1$ represents a hydrogen atom or a methyl group, and $L_1$ represents an alkylene group including from 2 through 18 carbon atoms, preferably an alkylene group including from 2 through 16 carbon atoms, and more preferably an alkylene group including from 2 through 12 carbon atoms. A naphthyl group present at a terminal via $L_1$ in the structure of which one terminal is open-ended (an open terminal: in other words, this structure is a pendant structure) has an excellent pigment adsorbing power based on π-π stacking with a pigment, which is a coloring material in a water-based ink.

As understood from the above description "naphthyl group present at a terminal via $L_1$ in the pendant", the structural unit represented by the general formula (1) may be a main chain of the copolymer including a pendant group such as a terminal naphthyl group or side-chain carboxyl group typically dangling via $L_1$. Of course, however, this does not exclude a case where the structural unit is partially included in a side chain.

For example, it is a well-known fact that it is difficult to completely eliminate a side-radical polymerization reaction that generates a branched structure.

In the general formula (2), $R_1$ represents a hydrogen atom or a methyl group and $L_2$ represents a single bond or —$(CH_2)$n-O— of which oxygen atom is bound with biphenyl, and n represents an integer of from 2 through 18 and preferably an integer of from 2 through 12. The biphenyl group present at a terminal via $L_2$ has an excellent pigment adsorbing power based on $\pi$-$\pi$ stacking with a pigment, which is a coloring material in a water-based ink.

The structural unit represented by the general formula (2) may be a main chain of the copolymer including a pendant group such as a terminal biphenyl group typically dangling via $L_2$. Of course, however, this does not exclude a case where the structural unit is partially included in a side chain.

For example, it is a well-known fact that it is difficult to completely eliminate a side-radical polymerization reaction that generates a branched structure.

When the copolymer of the present disclosure including the structural unit represented by the general formula (1) or the structural unit represented by the general formula (2) is used in preparation of a pigment dispersion of a pigment dispersed in water, the naphthyl group present at a terminal of a side chain of the copolymer provides easy adsorbability to a surface of the pigment and a high adsorbing power with respect to the pigment. This makes it possible to obtain a dispersion that has a high dispersibility and a long-term stability.

A weight average molecular weight Mw of the copolymer as a polystyrene equivalent is preferably in a range of from 5,000 through 80,000, more preferably in a range of from 10,000 through 60,000, and yet more preferably in a range of from 13,000 through 40,000.

When the weight average molecular weight of the copolymer is 5,000 or greater, dispersion stability is improved based on steric hindrance of the copolymer.

When the weight average molecular weight of the copolymer is 80,000 or less, there is less networking in the copolymer. This prevents increase in viscosity and improves discharging stability.

It is possible to control the weight average molecular weight of the copolymer to some degree based on a polymerization temperature, an amount of a polymerization initiator, and concentrations of monomers during a reaction. As for the polymerization temperature, polymerization at a high temperature for a short time tends to provide a copolymer having a low molecular weight, and polymerization at a low temperature for a long time tends to provide a copolymer having a high molecular weight.

When the copolymer includes the structural unit having affinity with a solvent in a manner that the structural unit represented by the general formula (1) or the structural unit represented by the general formula (2) accounts for 90% by mass or less of the copolymer, the copolymer can dissolve in a solvent favorably. It is preferable that the structural unit represented by the general formula (1) or the structural unit represented by the general formula (2) account for 1% by mass or greater but 90% by mass or less of the copolymer.

When both of the structural unit represented by the general formula (1) and the structural unit represented by the general formula (2) are used in combination, it is preferable that the total of both account for 1% by mass or greater but 90% by mass or less of the copolymer.

The copolymer of the present disclosure includes a repeating unit formed of at least one any other hydrophilic polymerizable monomer, in addition to the structural unit represented by the general formula (1) or the structural unit represented by the general formula (2).

Examples of the structural unit formed of a hydrophilic group include a structural unit including an anionic group, a structural unit including a cationic group, and a structural unit including a nonionic group.

A structural unit including an anionic group or a nonionic group as the hydrophilic group is preferable, because these hydrophilic groups prevent the copolymer from causing cross-linking aggregation of binding with acidic group sites present on surfaces of different pigment particles and making the pigment particles aggregate with each other.

Examples of the any other polymerizable hydrophilic monomer include: anionic unsaturated ethylene monomers such as (meth)acrylic acid or salts of (meth)acrylic acid, maleic acid or salts of maleic acid, monomethyl maleate, itaconic acid, monomethyl itaconate, fumaric acid, 4-styrenesulfonic acid, 2-acrylamide-2-methylpropanesulfonic acid, and unsaturated ethylene monomers including phosphoric acid, phosphonic acid, alendronic acid, or etidronic acid; nonionic unsaturated ethylene monomers such as (meth)acrylic acid-2-hydroxyethyl, diethylene glycol mono (meth)acrylate, triethylene glycol mono(meth)acrylate, tetraethylene glycol mono(meth)acrylate, polyethylene glycol mono(meth)acrylate, (meth)acrylamide, N-methylol(meth) acrylamide, N-vinylformamide, N-vinylacetamide, N-vinylpyrrolidone, acrylamide, N,N-dimethylacrylamide, N-t-butylacrylamide, N-octylacrylamide, and N-t-octylacrylamide; and cationic unsaturated ethylene monomers such as dimethylaminoethyl(meth)acrylamide, dimethylaminopropyl(meth)acrylamide, and methacryloylcholine chloride.

The copolymer of the present disclosure may include a structural unit formed of any other polymerizable monomer in addition to: at least one of the structural unit represented by the general formula (1) and the structural unit represented by the general formula (2); and the any other polymerizable hydrophilic monomer.

The any other polymerizable monomer is not particularly limited and may be appropriately selected depending on the intended purpose. Examples of the any other polymerizable monomer include polymerizable hydrophobic monomers and polymerizable surfactants.

Examples of the polymerizable hydrophobic monomers include: unsaturated ethylene monomers including an aromatic ring, such as $\alpha$-methylstyrene, 4-t-butylstyrene, and 4-chloromethylstyrene; alkyl (meth)acrylates such as methyl (meth)acrylate, ethyl (meth)acrylate, (meth)acrylic acid-n-butyl, dimethyl maleate, dimethyl itaconate, dimethyl fumarate, lauryl (meth)acrylate (C12), tridecyl (meth)acrylate (C13), tetradecyl (meth)acrylate (C14), pentadecyl (meth)acrylate (C15), hexadecyl (meth)acrylate (C16), heptadecyl (meth)acrylate (C17), nonadecyl (meth)acrylate (C19), eicosyl (meth)acrylate (C20), heneicosyl (meth)acrylate (C21), and docosyl (meth)acrylate (C22); and unsaturated ethylene monomers including an alkyl group, such as 1-heptene, 3,3-dimethyl-1-pentene, 4,4-dimethyl-1-pentene, 3-methyl-1-hexene, 4-methyl-1-hexene, 5-methyl-1-hexene, 1-octene, 3,3-dimethyl-1-hexene, 3,4-dimethyl-1-hexene, 4,4-dimethyl-1-hexene, 1-nonene, 3,5,5-trimethyl-1-hexene, 1-decene, 1-undecene, l-dodecene, 1-tridecene, 1-tetradecene, 1-pentadecene, 1-hexadecene, 1-heptadecene, 1-octadecene, 1-nonadecene, 1-eicosene, and 1-docosene. One of these polymerizable hydrophobic monomers may be used alone or two or more of these polymerizable hydrophobic monomers may be used in combination.

The polymerizable surfactant is an anionic or nonionic surfactant including at least one or more radical-polymerizable unsaturated double-bonding groups in a molecule.

Examples of the anionic surfactant include: hydrocarbon compounds including a sulfate group such as an ammonium sulfate group ($—SO_3^-NH_4^+$) and an allyl group ($—CH_2—CH═CH_2$); hydrocarbon compounds including a sulfate group such as an ammonium sulfate group ($—SO_3^-NH_4^+$) and a methacryl group [$—CO—C(CH_3)═CH_2$]; and aromatic hydrocarbon compounds including a sulfate group such as an ammonium sulfate group ($—SO_3^-NH_4^+$) and a 1-propenyl group ($—CH═CH_2CH_3$). Specific examples of these compounds include: ELEMINOL JS-20 and RS-300 available from Sanyo Chemical Industries, Ltd.; and AQUALON KH-10, AQUALON KH-1025, AQUALON KH-05, AQUALON HS-10, AQUALON HS-1025, AQUALON BC-0515, AQUALON BC-10, AQUALON BC-1025, AQUALON BC-20, and AQUALON BC-2020 available from DKS Co., Ltd.

Examples of the nonionic surfactant include hydrocarbon compounds and aromatic hydrocarbon compounds including a 1-propenyl group ($—CH═CH_2CH_3$) and a polyoxyethylene group [$—(C_2H_4O)n-H$]. Specific examples of these compounds include: AQUALON RN-20, AQUALON RN-2025, AQUALON RN-30, and AQUALON RN-50 available form DKS Co., Ltd.; and LATEMUL PD-104, LATEMUL PD-420, LATEMUL PD-430, and LATEMUL PD-450 available from Kao Corporation.

One of the polymerizable surfactants or two or more of the polymerizable surfactants as a mixture may be used in an amount of from 0.1% by mass through 10% by mass of a total amount of at least one of a monomer forming the structural unit represented by the general formula (1) and a monomer forming the structural unit represented by the general formula (2).

The structure of the copolymer can be analyzed using a common analysis method such as NMR and IR.

A ratio by mole of a structural unit constituting the copolymer can be obtained from a ratio by mole of a monomer used in synthesizing the copolymer. Furthermore, the ratio by mole of a structural unit can also be obtained from the copolymer by NMR.

The monomer having the structural unit represented by the general formula (1) can be obtained, for example, through reactions represented by reaction formulae (1) and (2) below. First, as represented by the reaction formula (1), naphthalene carbonyl chloride (A-1) and an excessive amount of a diol compound are allowed to undergo a condensation reaction in the presence of an acid acceptor such as amine or pyridine, to obtain naphthalene carboxylic acid hydroxyalkyl ester (A-2). Then, as represented by the reaction formula (2), 2-methacryloyloxyethyl isocyanate (A-3) and the (A-2) are allowed to undergo a reaction, to obtain a monomer (A-4), which is a compound having the structural unit represented by the general formula (1).

Then, the monomer (A-4) and at least one hydrophilic monomer are allowed to undergo copolymerization in the presence of a radical polymerization initiator, to obtain the copolymer of the present disclosure.

A weight average molecular weight of the monomer (A-4) is from 357 through 596 because in the general formula (1), $L_1$ is an alkylene group including from 2 through 18 carbon atoms and $R_1$ is a hydrogen atom or a methyl group.

Reaction formula (1)

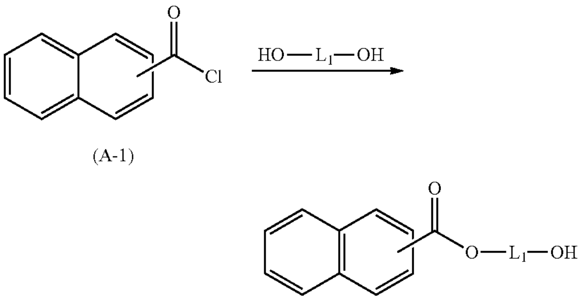

(A-1)

(A-2)

Reaction formula (2)

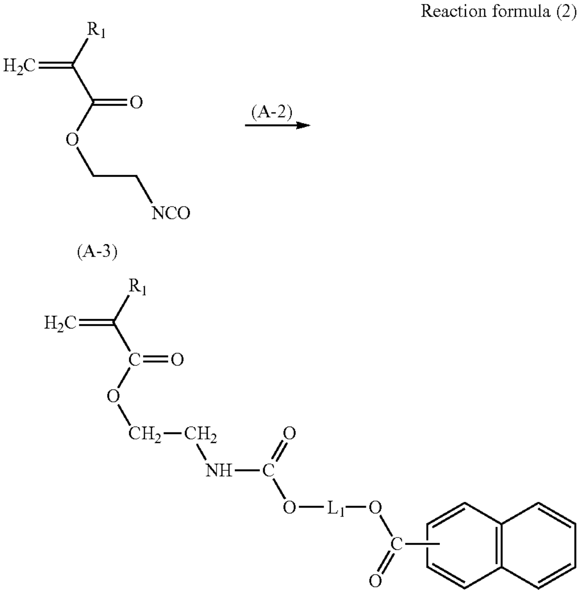

(A-3)

(A-4)

In the reaction formulae (1) and (2), $R_1$ and $L_1$ represent the same as in the general formula (1).

The monomer having the structural unit represented by the general formula (2) can be obtained, for example, through reactions represented by reaction formulae (3) and (4) below. First, as represented by the reaction formula (3), phenylphenol (B-1) and an alcohol bromide compound are allowed to undergo a reaction in the presence of potassium carbonate, to obtain hydroxyalkyl ether (B-2). Then, as represented by the reaction formula (4), 2-methacryloyloxyethyl isocyanate (B-3) and the (B-2) are allowed to undergo a reaction, to obtain a monomer (B-4), which is a compound having the structural unit represented by the general formula (2).

Then, the monomer (B-4) and at least one hydrophilic monomer are allowed to undergo copolymerization in the presence of a radical polymerization initiator, to obtain the copolymer of the present disclosure.

A weight average molecular weight of the monomer (B-4) is from 311 through 594 because in the general formula (2), $L_2$ is a single bond or $—(CH_2)n-O—$, n is an integer of from 2 through 18, and $R_1$ is a hydrogen atom or a methyl group.

Reaction formula (3)

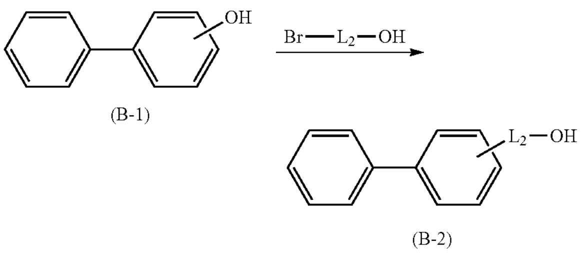

In the reaction formula (3), $L_2$ represents the same as in the general formula (2).

Reaction formula (4)

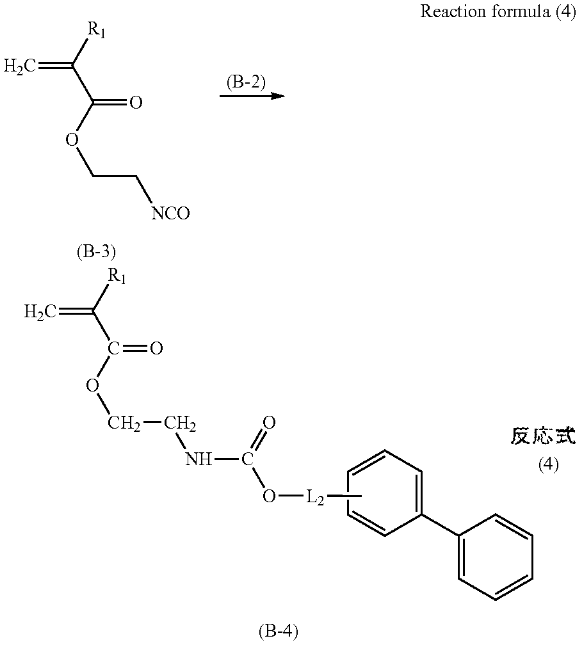

In the reaction formula (4), $R_1$ and $L_2$ represent the same as in the general formula (2).

The radical polymerization initiator is not particularly limited and may be appropriately selected depending on the intended purpose. Examples of the radical polymerization initiator include peroxyketal, hydroperoxide, dialkyl peroxide, diacyl peroxide, peroxy dicarbonate, peroxy ester, cyano-based azobisisobutyronitrile, cyano-based azobis(2-methylbutyronitrile), cyano-based azobis(2,2'-isovaleronitrile), and non-cyano-based dimethyl-2,2'-azobisisobutyrate. Among these radical polymerization initiators, organic peroxides and azo-based compounds are preferable and azo-based compounds are particularly preferable because molecular weight control is easy and a decomposition temperature is low.

A content of the radical polymerization initiator is not particularly limited and may be appropriately selected depending on the intended purpose. However, the content of the radical polymerization initiator is preferably from 1% by mass through 10% by mass of a total amount of polymerizable monomers.

In order to adjust a molecular weight of the copolymer, a chain-transfer agent may be added in an appropriate amount. Examples of the chain-transfer agent include mercaptoacetic acid, mercaptopropionic acid, 2-propanethiol, 2-mercaptoethanol, thiophenol, dodecylmercaptan, 1-dodecanethiol, and thioglycerol.

A polymerization temperature is not particularly limited and may be appropriately selected depending on the intended purpose. However, the polymerization temperature is preferably from 50° C. through 150° C. and more preferably from 60° C. through 100° C. A polymerization time is not particularly limited and may be appropriately selected depending on the intended purpose. However, the polymerization time is preferably from 3 hours through 48 hours.

<Coloring Material>

As a coloring material, a coloring material represented by the general formula (3) such as C.I. Pigment Yellow 74 is used, because such a coloring material is available at a relatively low price, is excellent in color tone, and has a broad color reproduction range.

It is difficult for other kinds of pigments to satisfy a low price, an excellent color tone, and a broad color reproduction range.

The C.I. Pigment Yellow 74 has a structural formula presented below.

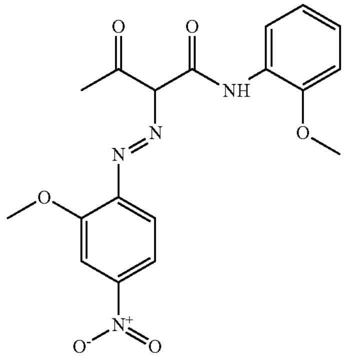

Acidic sites on a surface of the pigment may inhibit π-π stacking between the copolymer and the pigment component. More naphthyl groups of the copolymer can adsorb to a surface of the pigment with less acidic sites. A higher copolymer density on the surface of the pigment provides a pigment particle dispersion with a higher stability based on steric hindrance of the copolymer. This can prevent aggregation of pigment particles in an ink or a dispersion, and can improve discharging reliability and storage stability.

Specifically, an acid value of the pigment is 15 μmol/g or less and preferably 11 μmol/g or less.

An acid value of 0 μmol/g or greater is preferable.

The acid value of the pigment can be measured in a manner described below.

(1) An Erlenmeyer flask is charged with the pigment (2 g) and a 0.01 mol/L tetrabutylammonium hydroxide solution (30 mL), sealed hermetically, and subjected to ultrasonic dispersion at 20° C. for 1 hour.

(2) The pigment is centrifugally separated from the obtained dispersion liquid, and a supernatant (10 mL) is diluted with MIBK (100 mL).

(3) The diluted liquid of (2) is subjected to back titration with a 0.01 mol/L perchloric acid MIBK solution.

(4) An amount of TBAH consumed by the acid on the surface of the pigment is calculated from the titer to determine an acid content per unit weight. A result obtained by converting the titer to μmol/g is used as the acid value of the pigment.

The proportion of the coloring material in ink is preferably from 0.1 to 15 percent by mass and more preferably from 1 to 10 percent by mass in terms of enhancement of image density, fixability, and discharging stability.

<Water>

The proportion of water in the ink has no particular limit. In terms of the drying property and discharging reliability of the ink, the proportion is preferably from 10 to 90 percent by mass and more preferably from 20 to 60 percent by mass.

<Organic Solvent>

There is no specific limitation on the type of the organic solvent used in the present disclosure. For example, water-soluble organic solvents are suitable. Specific examples thereof include, but are not limited to, polyols, ethers such as polyol alkylethers and polyol arylethers, nitrogen-containing heterocyclic compounds, amides, amines, and sulfur-containing compounds.

Specific examples of the water-soluble organic solvents include, but are not limited to, polyols such as ethylene glycol, diethylene glycol, 1,2-propanediol, 1,3-propanediol, 1,2-butanediol, 1,3-butanediol, 1,4-butanediol, 2,3-butanediol, 3-methyl-1,3-butane diol, triethylene glycol, polyethylene glycol, polypropylene glycol, 1,2-pentanediol, 1,3-pentanediol, 1,4-pentanediol, 2,4-pentanediol, 1,5-pentanediol, 1,2-hexanediol, 1,6-hexanediol, 1,3-hexanediol, 2,5-hexanediol, 1,5-hexanediol, glycerin, 1,2,6-hexanetriol, 2-ethyl-1,3-hexanediol, ethyl-1,2,4-butane triol, 1,2,3-butanetriol, 2,2,4-trimethyl-1,3-pentanediol, and petriol; polyol alkylethers such as ethylene glycol monoethylether, ethylene glycol monobutylether, diethylene glycol monomethylether, diethylene glycol monoethylether, diethylene glycol monobutylether, tetraethylene glycol monomethylether, and propylene glycol monoethylether; polyol arylethers such as ethylene glycol monophenylether and ethylene glycol monobenzylether; nitrogen-containing heterocyclic compounds such as 2-pyrolidone, N-methyl-2-pyrolidone, N-hydroxyethyl-2-pyrolidone, 1,3-dimethyl-2-imidazolidinone, ϵ-caprolactam, and γ-butyrolactone; amides such as formamide, N-methylformamide, N,N-dimethylformamide, 3-methoxy-N,N-dimethyl propioneamide, and 3-buthoxy-N,N-dimethyl propioneamide; amines such as monoethanolamine, diethanolamine, and triethylamine; sulfur-containing compounds such as dimethyl sulfoxide, sulfolane, and thiodiethanol; propylene carbonate, and ethylene carbonate.

Since the water-soluble organic solvent serves as a humectant and also imparts a good drying property, it is preferable to use an organic solvent having a boiling point of 250 degrees C. or lower.

Polyol compounds having eight or more carbon atoms and glycol ether compounds are also suitable. Specific examples of the polyol compounds having eight or more carbon atoms include, but are not limited to, 2-ethyl-1,3-hexanediol and 2,2,4-trimethyl-1,3-pentanediol.

Specific examples of the glycolether compounds include, but are not limited to, polyol alkylethers such as ethyleneglycol monoethylether, ethyleneglycol monobutylether, diethylene glycol monomethylether, diethyleneglycol monoethylether, diethyleneglycol monobutylether, tetraethyleneglycol monomethylether, propyleneglycol monoethylether; and polyol arylethers such as ethyleneglycol monophenylether and ethyleneglycol monobenzylether.

The polyol compounds having eight or more carbon atoms and glycolether compounds enhance the permeability of ink when paper is used as a print medium.

A solubility parameter (SP value) of the water-soluble organic solvent is preferably 8.0 $(cal/cm^3)^{1/2}$ or greater but 15.0 $(cal/cm^3)^{1/2}$ or less in terms of increasing a permeating speed into a print medium. A value calculated by a Fedors method is used as the solubility parameter.

One of these water-soluble organic solvents may be used alone or two or more of these water-soluble organic solvents may be used in combination.

Examples of water-soluble organic solvents having a solubility parameter in a range of 8.0 $(cal/cm^3)^{1/2}$ or greater but 15.0 $(cal/cm^3)^{1/2}$ or less include the following. Parenthesized values indicate SP values (unit: $(cal/cm^3)^{1/2}$).

Examples include tripropylene glycol dimethyl ether (8.1), ethylene glycol mono-n-butyl ether acetate (9.2), triethylene glycol monobutyl ether (10.2), 3-ethyl-3-hydroxymethyloxetane (10.7), 3-methyl-1,3-butanediol (12.1), 1,2-hexanediol (13.2), 2-pyrrolidone (13.59), and ethylene glycol (14.2).

The proportion of the organic solvent in ink has no particular limit and can be suitably selected to suit a particular application. In terms of the drying property and discharging reliability of the ink, the proportion is preferably from 10 to 60 percent by mass and more preferably from 20 to 60 percent by mass.

A pigment particle diameter change rate after the pigment dispersion or the ink is stored is preferably 10% or less and more preferably 5% or less. When the pigment particle diameter change rate is 10% or less, nozzle clogging by aggregated particles is less likely to occur.

<Pigment Dispersion>

The ink can be obtained by mixing a coloring material with materials such as water and organic solvent. It is also possible to mix a pigment with water, a dispersant, etc., first to prepare a pigment dispersion and thereafter mix the pigment dispersion with materials such as water and organic solvent to manufacture ink.

The pigment dispersion is obtained by mixing and dispersing water, pigment, pigment dispersant, and other optional components and adjusting the particle size. It is good to use a dispersing device for dispersion.

The particle diameter of the pigment in the pigment dispersion has no particular limit. For example, the maximum frequency in the maximum number conversion is preferably from 20 to 500 nm and more preferably from 20 to 150 nm to improve dispersion stability of the pigment and ameliorate the discharging stability and image quality such as image density. The particle diameter of the pigment can be measured using a particle size analyzer (Nanotrac Wave-UT151, manufactured by MicrotracBEL Corp).

In addition, the proportion of the pigment in the pigment dispersion is not particularly limited and can be suitably selected to suit a particular application. In terms of improving discharging stability and image density, the content is preferably from 0.1 to 50 percent by mass and more preferably from 0.1 to 30 percent by mass.

During the production, coarse particles are optionally filtered off with a filter, a centrifuge, etc. preferably followed by degassing.

<Resin>

The type of the resin contained in the ink has no particular limit. Specific examples thereof include, but are not limited to, urethane resins, polyester resins, acrylic-based resins, vinyl acetate-based resins, styrene-based resins, butadiene-based resins, styrene-butadiene-based resins, vinylchloride-based resins, acrylic styrene-based resins, and acrylic silicone-based resins.

Particles of such resins may be also used. It is possible to mix a resin emulsion in which the resin particles are dispersed in water serving as a dispersion medium with materials such as a coloring agent and an organic solvent to obtain ink. The resin particle can be synthesized or is available on the market. It is possible to synthesize the resin particle or obtain from market. These can be used alone or in combination of the resin particles.

The volume average particle diameter of the resin particle is not particularly limited and can be suitably selected to suit to a particular application. The volume average particle diameter is preferably from 10 to 1,000 nm, more preferably from 10 to 200 nm, and furthermore preferably from 10 to 100 nm to obtain good fixability and image hardness.

The volume average particle diameter can be measured by using a particle size analyzer (Nanotrac Wave-UT151, manufactured by MicrotracBEL Corp).

The proportion of the resin is not particularly limited and can be suitably selected to suit to a particular application. In terms of fixability and storage stability of ink, it is preferably from 1 to 30 percent by mass and more preferably from 5 to 20 percent by mass to the total content of the ink.

The particle diameter of the solid portion in ink has no particular limit. For example, the maximum frequency in the maximum number conversion is preferably from 20 to 1,000 and more preferably from 20 to 150 nm to ameliorate the discharging stability and image quality such as image density. The solid portion includes resin particles, particles of pigments, etc. The particle diameter of the solid portion can be measured by using a particle size analyzer (Nanotrac Wave-UT151, manufactured by MicrotracBEL Corp).

<Additive>

Ink may further optionally contain a surfactant, a defoaming agent, a preservative and fungicide, a corrosion inhibitor, a pH regulator, etc.

<Surfactant>

Examples of the surfactant are silicone-based surfactants, fluorosurfactants, amphoteric surfactants, nonionic surfactants, anionic surfactants, etc.

The silicone-based surfactant has no specific limit and can be suitably selected to suit to a particular application. Of these, preferred are silicone-based surfactants which are not decomposed even in a high pH environment. Specific examples thereof include, but are not limited to, side-chain-modified polydimethylsiloxane, both end-modified polydimethylsiloxane, one-end-modified polydimethylsiloxane, and side-chain-both-end-modified polydimethylsiloxane. A silicone-based surfactant having a polyoxyethylene group or a polyoxyethylene polyoxypropylene group is particularly preferable because such an agent demonstrates good characteristics as an aqueous surfactant. It is possible to use a polyether-modified silicone-based surfactant as the silicone-based surfactant. A specific example thereof is a compound in which a polyalkylene oxide structure is introduced into the side chain of the Si site of dimethyl silooxane.

Specific examples of the fluoro surfactants include, but are not limited to, perfluoroalkyl sulfonic acid compounds, perfluoroalkyl carboxylic acid compounds, perfluoroalkyl phosphoric acid ester compounds, adducts of perfluoroalkyl ethylene oxide, and polyoxyalkylene ether polymer compounds having a perfluoroalkyl ether group in its side chain. These are particularly preferable because they do not foam easily. Specific examples of the perfluoroalkyl sulfonic acid compounds include, but are not limited to, perfluoroalkyl sulfonic acid and salts of perfluoroalkyl sulfonic acid. Specific examples of the perfluoroalkyl carboxylic acid compounds include, but are not limited to, perfluoroalkyl carboxylic acid and salts of perfluoroalkyl carboxylic acid. Specific examples of the polyoxyalkylene ether polymer compounds having a perfluoroalkyl ether group in its side chain include, but are not limited to, sulfuric acid ester salts of polyoxyalkylene ether polymer having a perfluoroalkyl ether group in its side chain and salts of polyoxyalkylene ether polymers having a perfluoroalkyl ether group in its side chain. Counter ions of salts in these fluorine-based surfactants are, for example, Li, Na, K, $NH_4$, $NH_3CH_2CH_2OH$, $NH_2(CH_2CH_2OH)_2$, and $NH(CH_2CH_2OH)_3$.

Specific examples of the amphoteric surfactants include, but are not limited to, lauryl aminopropionic acid salts, lauryl dimethyl betaine, steallyl dimethyl betaine, and lauryl dihydroxyethyl betaine.

Specific examples of the nonionic surfactants include, but are not limited to, polyoxyethylene alkyl phenyl ethers, polyoxyethylene alkyl esters, polyoxyethylene alkyl amines, polyoxyethylene alkyl amides, polyoxyethylene propylene block polymers, sorbitan aliphatic acid esters, polyoxyethylene sorbitan aliphatic acid esters, and adducts of acetylene alcohol with ethylene oxides, etc.

Specific examples of the anionic surfactants include, but are not limited to, polyoxyethylene alkyl ether acetates, dodecyl benzene sulfonates, laurates, and polyoxyethylene alkyl ether sulfates.

These can be used alone or in combination.

The silicone-based surfactants has no particular limit. Specific examples thereof include, but are not limited to, side-chain-modified polydimethyl siloxane, both end-modified polydimethylsiloxane, one-end-modified polydimethylsiloxane, and side-chain-both-end-modified polydimethylsiloxane. In particular, a polyether-modified silicone-based surfactant having a polyoxyethylene group or a polyoxyethylene polyoxypropylene group is particularly preferable because such a surfactant demonstrates good characteristics as an aqueous surfactant.

Any suitably synthesized surfactant and any product thereof available on the market is suitable. Products available on the market are obtained from Byc Chemie Japan Co., Ltd., Shin-Etsu Silicone Co., Ltd., Dow Corning Toray Co., Ltd., etc., NIHON EMULSION Co., Ltd., Kyoeisha Chemical Co., Ltd., etc.

The polyether-modified silicon-containing surfactant has no particular limit. For example, a compound in which the polyalkylene oxide structure represented by the following Chemical structure S-1 is introduced into the side chain of the Si site of dimethyl polysiloxane.

Chemical structure S-1

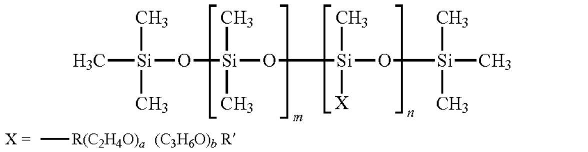

In the Chemical structure S-1, “m”, “n”, “a”, and “b” each, respectively represent integers, R represents an alkylene group, and R' represents an alkyl group.

Specific examples of polyether-modified silicone-based surfactants include, but are not limited to, KF-618, KF-642, and KF-643 (all manufactured by Shin-Etsu Chemical Co., Ltd.), EMALEX-SS-5602 and SS-1906EX (both manufactured by NIHON EMULSION Co., Ltd.), FZ-2105, FZ-2118, FZ-2154, FZ-2161, FZ-2162, FZ-2163, and FZ-2164 (all manufactured by Dow Corning Toray Co., Ltd.), BYK-33 and BYK-387 (both manufactured by BYK Japan KK.), and TSF4440, TSF4452, and TSF4453 (all manufactured by Momentive Performance Materials Inc.).

A fluorosurfactant in which the number of carbon atoms replaced with fluorine atoms is from 2 to 16 is preferable and, 4 to 16, more preferable.

Specific examples of the fluorosurfactants include, but are not limited to, perfluoroalkyl phosphoric acid ester compounds, adducts of perfluoroalkyl ethylene oxide, and polyoxyalkylene ether polymer compounds having a perfluoroalkyl ether group in its side chain. Of these, polyoxyalkylene ether polymer compounds having a perfluoroalkyl ether group in its side chain are preferable because they do not foam easily and the fluorosurfactant represented by the following Chemical formula F-1 or Chemical formula F-2 is more preferable.

$$CF_3CF_2(CF_2CF_2)_m—CH_2CH_2O(CH_2CH_2O)_nH$$ Chemical formula F-1

In the Chemical formula f-1, "m" is preferably 0 or an integer of from 1 to 10 and "n" is preferably 0 or an integer of from 1 to 40.

$$C_nF_{2n+1}—CH_2CH(OH)CH_2—O—(CH_2CH_2O)_a—Y$$ Chemical formula F-2

In the Chemical formula F-2, Y represents H, $C_nF_{2n+1}$, where "n" is an integer of from 1 to 6, $CH_2CH(OH)CH_2—C_1F_{2n+1}$, where n represents an integer of from 4 to 6, or $C_pH_{2p+1}$, where p represents an integer of from 1 to 19. "a" represents an integer of from 4 to 14.

Products available on the market may be used as the fluorosurfactant. Specific examples of the products available on the market include, but are not limited to, SURFLON S-111, SURFLON S-112, SURFLON S-113, SURFLON S-121, SURFLON S-131, SURFLON S-132, SURFLON S-141, and SURFLON S-145 (all manufactured by ASAHI GLASS CO., LTD.); FLUORAD FC-93, FC-95, FC-98, FC-129, FC-135, FC-170C, FC-430, and FC-431 (all manufactured by SUMITOMO 3M); MEGAFACE F-470, F-1405, and F-474 (all manufactured by DIC CORPORATION); ZONYL™ TBS, FSP, FSA, FSN-100, FSN, FSO-100, FSO, FS-300, UR, CAPSTONE® FS-30, FS-31, FS-3100, FS-34, FS-35 (all manufactured by The Chemours Company); FT-110, FT-250, FT-251, FT-400S, FT-150, and FT-400SW (all manufactured by NEOS COMPANY LIMITED); POLYFOX PF-136A, PF-156A, PF-151N, PF-154, PF-159 (manufactured by OMNOVA SOLUTIONS INC.), and UNIDYNE DSN-403N (manufactured by DAIKIN INDUSTRIES).

Of these, FS-3100, FS-34, and FS-300 (all manufactured by The Chemours Company), FT-110, FT-250, FT-251, FT-400S, FT-150, and FT-400SW (all manufactured by NEOS COMPANY LIMITED), PolyFox PF-151N (manufactured by OMNOVA SOLUTIONS INC.), and UNIDYNE DSN-403N (manufactured by DAIKIN INDUSTRIES) are particularly preferable in terms of good printing quality, coloring in particular, and improvement on permeation, wettability, and uniform dying property to paper.

The proportion of the surfactant in ink is not particularly limited. It is preferably from 0.001 to 5 percent by mass and more preferably from 0.05 to 5 percent by mass ink in terms of excellent wettability and discharging stability and improvement on image quality.

<Defoaming Agent>

The defoaming agent has no particular limit. For example, silicon-based defoaming agents, polyether-based defoaming agents, and aliphatic acid ester-based defoaming agents are suitable. These can be used alone or in combination. Of these, silicone-based defoaming agents are preferable to easily break foams.

<Preservatives and Fungicides>

The preservatives and fungicides are not particularly limited. A specific example is 1,2-benzisothiazoline-3-on.

<Corrosion Inhibitor>

The corrosion inhibitor has not particular limit. Examples thereof are acid sulfite and sodium thiosulfate.

<pH Regulator>

The pH regulator has no particular limit. It is preferable to adjust the pH to 7 or higher. Specific examples thereof include, but are not limited to, amines such as diethanol amine and triethanol amine.

The property of the ink is not particularly limited. For example, viscosity, surface tension, pH, etc, are preferably in the following ranges.

The viscosity of the ink at 25 degrees C. is preferably from 5 to 30 mPa·s and more preferably from 5 to 25 mPa·s to improve print density and text quality and obtain good dischargeability. The viscosity can be measured by, for example, a rotatory viscometer (RE-80L, manufactured by TOKI SANGYO CO., LTD.). The measuring conditions are as follows:

Standard cone rotor (1° 34'×R24)

Sample liquid amount: 1.2 mL

Number of rotations: 50 rotations per minute (rpm)

25 degrees C.

Measuring time: three minutes

The surface tension of the ink is preferably 35 mN/m or less and more preferably 32 mN/m or less at 25 degrees C. in terms that the ink is suitably levelized on a print medium and the drying time of the ink is shortened.

The pH of the ink is preferably from 7 to 12 and more preferably from 8 to 11 in terms of prevention of corrosion of metal materials contacting the ink.

<Pre-Processing Fluid>

The pre-processing fluid contains a flocculant, an organic solvent, water, and optional materials such as a surfactant, a defoaming agent, a pH regulator, a preservatives and fungicides and a corrosion inhibitor.

The organic solvent, the surfactant, the defoaming agent, the pH regulator, the preservatives and fungicides, and the corrosion inhibitor can be the same material as those for use in the ink. Also, other materials for use in known processing fluid can be used.

The type of the flocculant is not particularly limited. For example, water-soluble cationic polymers, acids, and multivalent metal salts are suitable.

<Post-Processing Fluid>

The post-processing fluid has no particular limit. It is preferable that the post-processing fluid can form a transparent layer. Materials such as organic solvents, water, resins, surfactants, defoaming agents, pH regulators, preservatives and fungicides, corrosion inhibitors, etc. are suitably selected based on a necessity basis and mixed to obtain the post-processing fluid. The post-processing fluid can be applied to the entire printing area on a print medium or only the printed area.

<Print Medium>

The print medium for use in printing is not particularly limited. Specific examples thereof include, but are not limited to, plain paper, gloss paper, special paper, cloth, film, transparent sheets, printing paper for general purpose.

<Printed Matter>

The printed matter of the present disclosure includes a print medium and an image formed on the print medium with the ink of the present disclosure.

An inkjet printing device and an inkjet printing method are used to print the image on the print medium to obtain the printed matter.

<Pringing Device and Printing Method>

The ink of the present disclosure can be suitably applied to various printing devices employing an inkjet printing method such as printers, facsimile machines, photocopiers, multifunction peripherals (serving as a printer, a facsimile machine, and a photocopier), and 3D model manufacturing devices (3D printers, additive manufacturing device).

In the present disclosure, the printing device and the printing method represent a device capable of discharging ink, various processing fluids, etc. to a print medium and a method printing an image on the print medium using the device. The print medium means an article to which the ink or the various processing fluids can be attached at least temporarily.

The printing device may further optionally include a device relating to feeding, transferring, and ejecting the print medium and other devices referred to as a pre-processing device, a post-processing device, etc. in addition to the head portion to discharge the ink.

The printing device and the printing method may further optionally include a heater for use in the heating process and a drier for use in the drying process. For example, the heating device and the drying device heat and dry the top surface and the bottom surface of a print medium having an image. The heating device and the drying device are not particularly limited. For example, a fan heater and an infra-red heater can be used. The print medium can be heated and dried before, during, and after printing.

In addition, the printing device and the printing method are not limited to those producing merely meaningful visible images such as texts and figures with the ink. For example, the printing device and the printing method can produce patterns like geometric design and 3D images.

In addition, the printing device includes both a serial type device in which the liquid discharging head is caused to move and a line type device in which the liquid discharging head is not moved, unless otherwise specified.

Furthermore, in addition to the desktop type, this printing device includes a wide type capable of printing images on a large print medium such as A0, a continuous printer capable of using continuous paper wound up in a roll form as print media.

Figure 2:
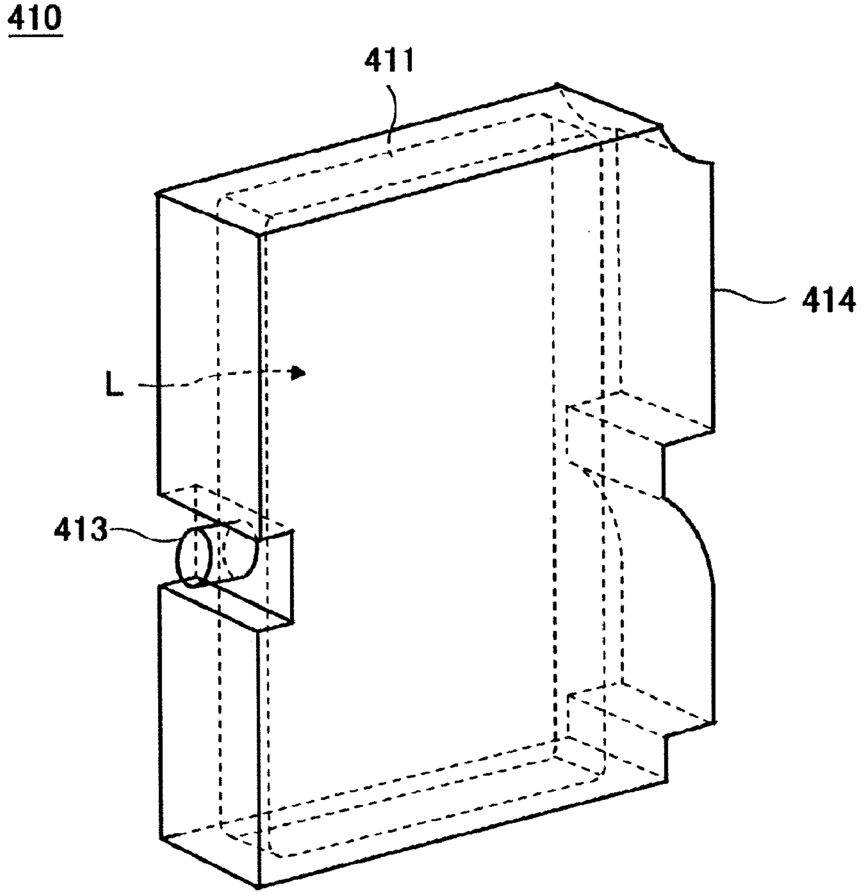
FIG. 2 is a perspective view illustrating an example of a main tank storing an ink according to an embodiment of the present disclosure.

The printing device of the present disclosure is described using an example with reference to FIG. 1 and FIG. 2. FIG. 1 is a perspective view illustrating the image printing device. FIG. 2 is a perspective view illustrating the main tank. An image forming apparatus 400 as an example of the printing device is a serial type image forming apparatus. A mechanical unit 420 is disposed in an exterior 401 of the image forming apparatus 400. Each ink accommodating unit (ink container) 411 of each main tank 410 (410*k*, 410*c*, 410*m*, and 410*y*) for each color of black (K), cyan (C), magenta (M), and yellow (Y) is made of a packing member such as aluminum laminate film. The ink container 411 is accommodated in a plastic housing unit 414. As a result, the main tank 410 is used as an ink cartridge of each color.

A cartridge holder 404 is disposed on the rear side of the opening when a cover 401*c* is opened. The cartridge holder 404 is detachably attached to the main tank 410. As a result, each ink discharging outlet 413 of the main tank 410 is communicated with a discharging head 434 for each color via a supplying tube 436 for each color so that the ink can be discharged from the discharging head 434 to a print medium.

This printing device includes may include not only a portion discharging ink but also a device referred to as a pre-processing device, a post-processing device, etc.

As an example of the pre-processing device and the post-processing device, as in the case of the ink such as black (K), cyan (C), magenta (M), and yellow (Y), a liquid container containing a pre-processing fluid or a post-processing fluid and a liquid discharging head are added to discharge the pre-processing fluid or the post-processing fluid in an inkjet printing method.

As another example of the pre-processing device and the post-processing device, it is suitable to dispose a pre-processing device and a post-processing device employing a blade coating method, a roll coating method, or a spray coating method other than the inkjet printing method.

How to use the ink is not limited to the inkjet printing method. Specific examples of such methods other than the inkjet printing method include, but are not limited to, blade coating methods, gravure coating methods, bar coating methods, roll coating methods, knife coating methods, dip coating methods, die coating methods, and spray coating methods.

The applications of the ink of the present disclosure are not particularly limited. For example, the ink can be used for printed matter, a paint, a coating material, and foundation. The ink can be used to form two-dimensional texts and images and furthermore a three-dimensional solid object (3D modeling object) as a material for 3D modeling.

An apparatus for fabricating a three-dimensional object can be any known device with no particular limit. For example, the apparatus includes an ink container, a supplying device, and a discharging device, a drier, etc. The three-dimensional solid object includes an object manufactured by re-applying ink. In addition, the three-dimensional solid object can be manufactured by processing a structure having a substrate such as a print medium printed with the ink as a molded processed product. The molded processed product is fabricated by, for example, heating drawing or punching a structure or printed matter having a sheet-like form, film-like form, etc.

The molded processed product is suitable for what is molded after surface-decorating. Examples thereof are gauges or operation panels of vehicles, office machines, electric and electronic machines, cameras, etc.

EXAMPLES

The present disclosure will be described below more specifically by way of Examples and Comparative Examples. The present disclosure should not be construed as being limited to the Examples. The units "part" and "%" in the Examples represent "part by mass" and "% by mass", respectively, unless otherwise expressly specified.

(Weight Average Molecular Weight of Copolymer)

A weight average molecular weight of a copolymer was measured according to a GPC method and using CTO-20A available from Shimadzu Corporation as a column thermostat bath, RID-10A available from Shimadzu Corporation as a detector, LC-20AD available from Shimadzu Corporation as an eluent flow path pump, DGU-20A available from Shimadzu Corporation as a degasser, and SIL-20A available from Shimadzu Corporation as an autosampler. Columns used were aqueous SEC columns, TSKGEL G3000PWXL (with an exclusion limit molecular weight of $2\times10^5$), TSK-GEL G5000PWXL (with an exclusion limit molecular weight of $2.5\times10^6$), and TSKGEL G6000PWXL (with an exclusion limit molecular weight of $5\times10^7$) available from Tosoh Corporation. The columns were used in a state of being coupled. The sample used for the measurement was adjusted to a concentration of 2 g/100 mL with an eluent. The eluent was an aqueous solution of acetic acid and sodium acetate both adjusted to 0.5 mol/liter. The measurement was performed at a column temperature of 40° C. at a flow rate of 1.0 mL/minute.

A calibration curve was obtained using 9 kinds of polyethylene glycols having molecular weights of 1,065, 5,050, 24,000, 50,000, 107,000, 140,000, 250,000, 540,000, and 920,000 as standard samples. The weight average molecular weight of the copolymer was obtained based on the calibration curve.

Production Example 1

Synthesis of Copolymer CP-1

1,6-Hexanediol (available from Tokyo Chemical Industry Co., Ltd.) (62.0 g) (525 mmol) was dissolved in methylene chloride (700 mL), and pyridine (20.7 g) (262 mmol) was added to the resultant.

Into this solution, a solution obtained by dissolving 2-naphthalene carbonyl chloride (available from Tokyo Chemical Industry Co., Ltd.) (50.0 g) (262 mmol) in methylene chloride (100 mL) was dropped for 2 hours under stirring. The resultant was stirred at room temperature for 6 hours. The obtained reaction solution was washed with water. An organic phase was isolated from the reaction solution and dried with magnesium sulfate, and the solvent was evaporated. The residue was purified by silica gel column chromatography using a methylene chloride/methanol (at a volume ratio of 98/2) mixture solvent as an eluent, to obtain 2-naphthoic acid-2-hydroxyethyl ester (52.5 g).

Next, the 2-naphthoic acid-2-hydroxyethyl ester (42.1 g) (155 mmol) was dissolved in dry methyl ethyl ketone (80 mL) and heated to 60° C. Into this solution, a solution obtained by dissolving 2-methacryloyloxyethyl isocyanate (KARENZ MOI available from Showa Denko K.K.) (24.0 g) (155 mmol) in dry methyl ethyl ketone (20 mL) was dropped for 1 hour under stirring. The resultant was stirred at 70° C. for 12 hours and cooled to room temperature, and the solvent was evaporated. The residue was purified by silica gel column chromatography using a methylene chloride/methanol (at a volume ratio of 99/1) mixture solvent as an eluent, to obtain a monomer M-1 (57.0 g) having a structure represented by structural formula (1-1) below.

Structural formula (1-1)

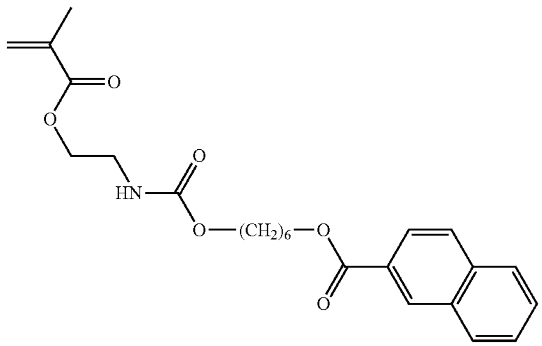

Next, acrylic acid (available from Tokyo Chemical Industry Co., Ltd.) (2.60 g) (36 mmol) and the monomer M-1 (15.42 g) (36 mmol) were dissolved in dry methyl ethyl ketone (90 mL), to prepare a monomer solution. Ten percent out of the monomer solution was heated to 75° C. under an argon gas stream. Into this solution, a solution obtained by dissolving 2,2'-azoiso(butyronitrile) (available from Tokyo Chemical Industry Co., Ltd.) (0.592 g) (3.6 mmol) in the remaining monomer solution was dropped for 1.5 hours. The resultant was stirred at 75° C. for 6 hours and cooled to room temperature. The obtained reaction solution was fed to hexane. A supernatant was discarded, and a precipitated copolymer was obtained. The obtained copolymer was dissolved in tetrahydrofuran, subjected to evaporation, and dried at reduced pressure, to obtain a copolymer (18.00 g) (with a weight average molecular weight Mw of 25,000 and a number average molecular weight Mn of 10,000).

Next, the obtained copolymer was dissolved in a tetraethylammonium hydroxide solution such that a concentration of the copolymer was 20% and pH was 8.0, to prepare an aqueous solution of a copolymer CP-1.

Production Example 2

Synthesis of Copolymer CP-2

A copolymer (with a weight average molecular weight Mw of 23,000 and a number average molecular weight Mn of 9,200) was obtained in the same manner as in Production example 1, using polyethylene glycol monomethacrylate (n≈4.5) (available from NOF Corporation) and the monomer M-1 synthesized in Production example 1. Next, the obtained copolymer was dissolved in ion-exchanged water such that a concentration of the copolymer was 20%, to prepare an aqueous solution of a copolymer CP-2.

Production Example 3

Synthesis of Copolymer CP-3

A copolymer (with a weight average molecular weight Mw of 20,000 and a number average molecular weight Mn of 8,000) was obtained in the same manner as in Production example 1, using dimethylaminopropyl methacrylamide (available from Tokyo Chemical Industry Co., Ltd.) and the monomer M-1 synthesized in Production example 1. Next, the obtained copolymer was dissolved in a hydrochloric acid solution such that a concentration of the copolymer was 20% and pH was 8.0, to prepare an aqueous solution of a copolymer CP-3.

Production Example 4

Synthesis of Copolymer CP-4

A monomer M-2 having a structure represented by structural formula (1-2) below was obtained in the same manner as in Production example, 1, except that ethylene glycol (available from Tokyo Chemical Industry Co., Ltd.) was used instead of 1,6-hexanediol.

Structural formula (1-2)

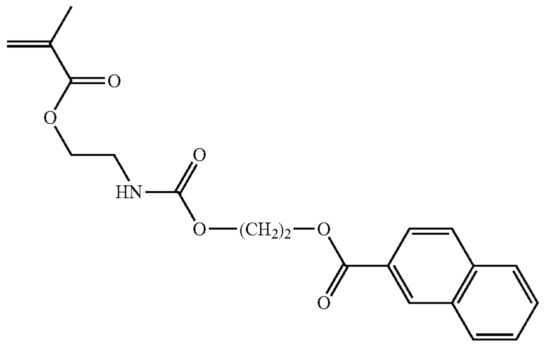

Next, a copolymer (with a weight average molecular weight Mw of 24,000 and a number average molecular weight Mn of 9,600) was obtained in the same manner as in Production example 1, using acrylic acid and the obtained monomer M-2. In the same manner as in Production example 1, an aqueous solution of a copolymer CP-4 was prepared such that a concentration of the copolymer was 20%.

Production Example 5

Synthesis of Copolymer CP-5

A monomer M-3 having a structure represented by structural formula (1-3) below was obtained in the same manner as in Production example 1, except that 1,12-dodecanediol (available from Tokyo Chemical Industry Co., Ltd.) was used instead of 1,6-hexanediol.

Structural formula (1-3)

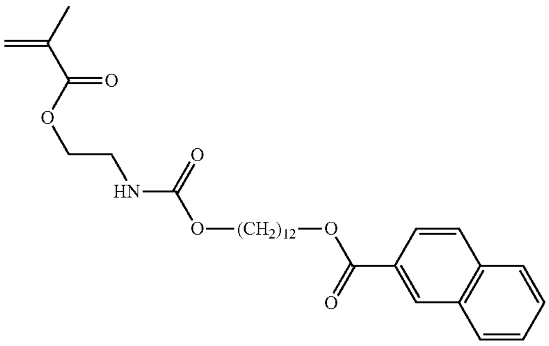

Next, a copolymer (with a weight average molecular weight Mw of 26,000 and a number average molecular weight Mn of 10,400) was obtained in the same manner as in Production example 1, using acrylic acid and the obtained monomer M-3. In the same manner as in Production example 1, an aqueous solution of a copolymer CP-5 was prepared such that a concentration of the copolymer was 20%.

Production Example 6

Synthesis of Copolymer CP-6

A monomer M-4 having a structure represented by structural formula (1-4) below was obtained in the same manner as in Production example 1, except that 1,16-hexadecanediol (available from Tokyo Chemical Industry Co., Ltd.) was used instead of 1,6-hexanediol.

Structural formula (1-4)

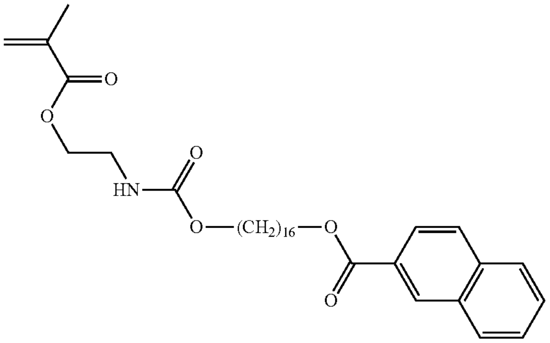

Next, a copolymer (with a weight average molecular weight Mw of 28,000 and a number average molecular weight Mn of 11,200) was obtained in the same manner as in Production example 1, using acrylic acid and the obtained monomer M-4. In the same manner as in Production example 1, an aqueous solution of a copolymer CP-6 was prepared such that a concentration of the copolymer was 20%.

Production Example 7

Synthesis of Copolymer CP-7

A copolymer (with a weight average molecular weight Mw of 13,000 and a number average molecular weight Mn of 5,600) was obtained in the same manner as in Production example 1, except that acrylic acid and the monomer M-1 synthesized in Production example 1 were dissolved in dry methyl ethyl ketone (225 mL). In the same manner as in Production example 1, an aqueous solution of a copolymer CP-7 was prepared such that a concentration of the copolymer was 20%.

Production Example 8

Synthesis of Copolymer CP-8

A copolymer (with a weight average molecular weight Mw of 40,000 and a number average molecular weight Mn of 16,000) was obtained in the same manner as in Production example 1, except that acrylic acid and the monomer M-1 synthesized in Production example 1 were dissolved in dry methyl ethyl ketone (60 mL). In the same manner as in Production example 1, an aqueous solution of a copolymer CP-8 was prepared such that a concentration of the copolymer was 20%.

Production Example 9

Synthesis of Copolymer CP-9

A copolymer (with a weight average molecular weight Mw of 60,000 and a number average molecular weight Mn of 24,000) was obtained in the same manner as in Production example 1, except that acrylic acid and the monomer M-1 synthesized in Production example 1 were dissolved in dry methyl ethyl ketone (45 mL). In the same manner as in Production example 1, an aqueous solution of a copolymer CP-9 was prepared such that a concentration of the copolymer was 20%.

Production Example 10

Synthesis Of Copolymer CP-10

A monomer M-5 having a structure represented by structural formula (1-5) below was obtained in the same manner as in Production example 1, except that 2-acryloyloxyethyl isocyanate was used instead of 2-methacryloyloxyethyl isocyanate.

Structural formula (1-5)

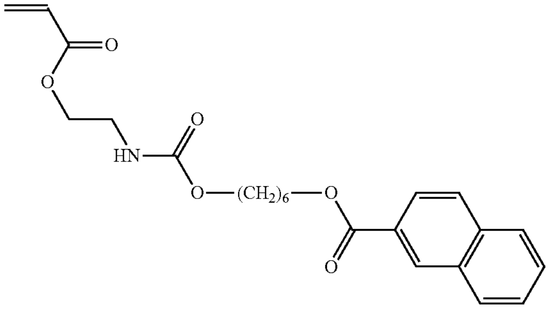

Next, a copolymer CP-10 (with a weight average molecular weight Mw of 24,000 and a number average molecular weight Mn of 9,600) was obtained in the same manner as in Production example 1, using acrylic acid and the obtained monomer M-5. In the same manner as in Production example 1, an aqueous solution of a copolymer CP-10 was prepared such that a concentration of the copolymer was 20%.

Production Example 11

Synthesis of Copolymer CP-11

2-Phenylphenol (available from Tokyo Chemical Industry Co., Ltd.) (40.0 g) (235 mmol) and 6-bromo-1-hexanol (available from Tokyo Chemical Industry Co., Ltd.) (51.06 g) (282 mmol) were dissolved in methyl ethyl ketone (600 mL). Calcium carbonate (97.4 g) was added to this solution. The resultant was heated under reflux for 8 hours, cooled to room temperature, and filtrated. The filtrate was concentrated. The obtained light brown liquid was dissolved in methylene chloride and washed with water. An organic phase was isolated from the liquid and dried with magnesium sulfate, and the solvent was evaporated. The residue was purified by silica gel column chromatography using methylene chloride as an eluent, to obtain 6-(2-phenylphenoxy)hexan-1-ol (105.3 g).

Next, 6-(2-phenylphenoxy)hexan-1-ol (14.10 g) (52 mmol) was dissolved in dry methyl ethyl ketone (50 mL) and heated to 40° C. Into this solution, 2-methacryloyloxyethyl isocyanate (KARENZ MOI available from Showa Denko K.K.) (8.09 g) (52 mmol) was dropped for 30 minutes under stirring. The resultant was stirred at 70° C. for 12 hours and cooled to room temperature, and the solvent was evaporated. The residue was purified by silica gel column chromatography using methylene chloride/methanol (at a volume ratio of 98/2) mixture solvent as an eluent, to obtain a monomer M-6 (18.88 g) having a structure represented by structural formula (2-1) below.

Structural formula (2-1)

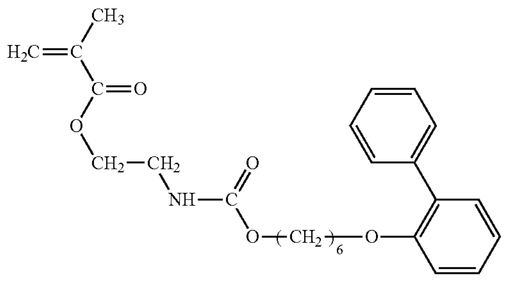

Next, acrylic acid (available from Tokyo Chemical Industry Co., Ltd.) (2.60 g) (36 mmol) and the monomer M-6 (15.36 g) (36 mmol) were dissolved in dry methyl ethyl ketone (65 mL), to prepare a monomer solution. Ten percent out of the monomer solution was heated to 75° C. under an argon gas stream. Into this solution, a solution obtained by dissolving 2,2'-azoiso(butyronitrile) (available from Tokyo Chemical Industry Co., Ltd.) (0.592 g) (3.6 mmol) in the remaining monomer solution was dropped for 1.5 hours. The resultant was stirred at 75° C. for 6 hours and cooled to room temperature. The obtained reaction solution was fed to hexane. A supernatant was discarded, and a precipitated copolymer was obtained. The obtained copolymer was dissolved in tetrahydrofuran, subjected to evaporation, and dried at reduced pressure, to obtain a copolymer (17.56 g) (with a weight average molecular weight Mw of 24,000 and a number average molecular weight Mn of 9,900).

Next, the obtained copolymer was dissolved in a tetraethylammonium hydroxide solution such that a concentration of the copolymer was 20% and pH was 8.0, to prepare an aqueous solution of a copolymer CP-11.

Production Example 12

Synthesis of Copolymer CP-12

A copolymer (with a weight average molecular weight Mw of 22,000 and a number average molecular weight Mn of 9,100) was obtained in the same manner as in Production example 11, using polyethylene glycol monomethacrylate (n≈4.5) (available from NOF Corporation) and the monomer M-6 synthesized in Production example 11 at a ratio described in Table 1-2. Next, the obtained copolymer was dissolved in ion-exchanged water such that a concentration of the copolymer was 20%, to prepare an aqueous solution of a copolymer CP-12.

Production Example 13

Synthesis of Copolymer CP-13

A copolymer (with a weight average molecular weight Mw of 13,000 and a number average molecular weight Mn of 5,500) was obtained in the same manner as in Production example 11, except that acrylic acid and the monomer M-6 synthesized in Production example 11 were dissolved in dry methyl ethyl ketone (160 mL). In the same manner as in Production example 11, an aqueous solution of a copolymer CP-13 was prepared.

Production Example 14

Synthesis of Copolymer CP-14

A copolymer (with a weight average molecular weight Mw of 40,000 and a number average molecular weight Mn of 15,900) was obtained in the same manner as in Production example 11, except that acrylic acid and the monomer M-6 synthesized in Production example 11 were dissolved in dry methyl ethyl ketone (45 mL). In the same manner as in Production example 11, an aqueous solution of a copolymer CP-14 was prepared.

Production Example 15

Synthesis of Copolymer CP-15

A copolymer (with a weight average molecular weight Mw of 60,000 and a number average molecular weight Mn of 23,900) was obtained in the same manner as in Production example 11, except that acrylic acid and the monomer M-6 synthesized in Production example 11 were dissolved in dry methyl ethyl ketone (35 mL). In the same manner as in Production example 11, an aqueous solution of a copolymer CP-15 was prepared.

TABLE 1-1

| | Copolymer | Monomer having structural unit represented by general formula (1) | | | Any other hydrophilic | Weight average molecular weight Mw of |
|---|---|---|---|---|---|---|
| | No. | Kind | $R_1$ | $L_1$ | polymerizable monomer | copolymer |
| Production example 1 | CP-1 | M-1 | $CH_3$ | —$(CH_2)_6$— | Acrylic acid | 25,000 |
| Production example 2 | CP-2 | M-1 | $CH_3$ | —$(CH_2)_6$— | Polyethylene glycol monomethacrylate | 23,000 |
| Production example 3 | CP-3 | M-1 | $CH_3$ | —$(CH_2)_6$— | Dimethylaminopropyl methacrylamide | 20,000 |
| Production example 4 | CP-4 | M-2 | $CH_3$ | —$(CH_2)_2$— | Acrylic acid | 24,000 |
| Production example 5 | CP-5 | M-3 | $CH_3$ | —$(CH_2)_{12}$— | Acrylic acid | 26,000 |
| Production example 6 | CP-6 | M-4 | $CH_3$ | —$(CH_2)_{16}$— | Acrylic acid | 28,000 |
| Production example 7 | CP-7 | M-1 | $CH_3$ | —$(CH_2)_6$— | Acrylic acid | 13,000 |
| Production example 8 | CP-8 | M-1 | $CII_3$ | —$(CII_2)_6$— | Acrylic acid | 40,000 |
| Production example 9 | CP-9 | M-1 | $CH_3$ | —$(CH_2)_6$— | Acrylic acid | 60,000 |
| Production example 10 | CP-10 | M-5 | H | —$(CH_2)_6$— | Acrylic acid | 24,000 |

TABLE 1-2

Weight average

Example 1

Preparation of Ink INK-1

(Preparation of Pigment Dispersion PD-1)

Ion-exchanged water (54.0 parts) was added to the copolymer aqueous solution prepared in Production example 1 (25.0 parts) and a yellow pigment (P.Y. 74, CHROMOFINE YELLOW 6270 AJC available from Dainichiseika Color & Chemicals Mfg. Co., Ltd.) (20.0 parts) to total to 100 parts, and the resultant was stirred for 12 hours. The obtained mixture was subjected to circulation dispersion with a disk-type bead mill (available from Shinmaru Enterprises Corporation, KDL type, media used: zirconia balls having a diameter of 0.1 mm) at a peripheral velocity of 10 m/s for 1 hour and filtrated through a membrane filter having a pore diameter of 1.2 μm. Ion-exchanged water in an adjustment amount was added to the resultant, to obtain a pigment dispersion PD-1 (with a pigment solid concentration of 20%).

(Production of Ink)

Materials of the prescription described in Table 3-1 below were mixed, stirred for 1 hour, and filtrated through a membrane filter having a pore diameter of 1.2 μm, to obtain a water-based ink INK-1 of the present disclosure.

Examples 2 to 24

Preparation of Inks INK-2 to INK-24

(Preparation of Pigment Dispersions PD-2 to PD-21)

Pigment dispersions PD-2 to PD-21 were obtained in the same manner as in Example 1, using the materials presented in Tables 2-1 and 2-2 below.

Pigments (Pigment Yellow 74) used and acid values of the pigments are as follows.

- CHROMOFINE YELLOW 6270 AJC available from Dainichiseika Color & Chemicals Mfg. Co., Ltd., with an acid value of 11 μmol/g
- FAST YELLOW 531 available from Dainichiseika Color & Chemicals Mfg. Co., Ltd., with an acid value of 17 μmol/g
- INK JET YELLOW 5GX-W available from Clariant AG, with an acid value of 25 μmol/g (Production of Ink)

Materials of the prescriptions described in Tables 3-1 to 3-4 were mixed, and water-based inks INK-2 to INK-24 of the present disclosure were obtained in the same manner as in Example 1.

Comparative Example 1

Preparation of Ink RINK-1

A copolymer RCP-1 (with a weight average molecular weight Mw of 20,000 and a number average molecular weight Mn of 8,000) (6.36 g) was obtained in the same manner as in Production example 1, except that the monomer M-1 of Production example 1 was changed to a monomer having a structure represented by structural formula (3) below. Then, an aqueous solution of the copolymer RCP-1 was prepared in the same manner as in Production example 1.

Structural formula (3)

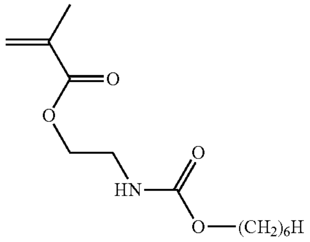

A comparative pigment dispersion RPD-1 was obtained in the same manner as in Example 1, except that the aqueous solution of the comparative copolymer RCP-1 was used instead of the aqueous solution of the copolymer CP-1 used in the preparation of the pigment dispersion of Example 1.

Next, a comparative water-based ink RINK-1 was obtained in the same manner as in Example 1, except that the comparative pigment dispersion RPD-1 was used instead of the pigment dispersion PD-1 used in the production of the ink of Example 1.

Comparative Examples 2 and 3

Preparation of Inks RINK-2 and RINK-3

Comparative pigment dispersions RPD-2 and RPD-3 were obtained in the same manner as in Example 1, except that the pigments presented in Table 2-2 were used instead of the pigment used in the preparation of the pigment dispersion of Example 1.

Next, comparative water-based inks RINK-2 and RINK-3 were obtained in the same manner as in Example 1, except that the comparative pigment dispersions RPD-2 and RPD-3 were used instead of the pigment dispersion PD-1 used in the production of the ink of Example 1.

TABLE 2-1

| | Pigment dispersion | | | | | | | | | | | |
|---|---|---|---|---|---|---|---|---|---|---|---|---|
| | PD-1 | PD-2 | PD-3 | PD-4 | PD-5 | PD-6 | PD-7 | PD-8 | PD-9 | PD-10 | PD-11 | PD-12 |
| CP-1 20% aqueous solution | 25.0 | 15.0 | 50.0 | 12.5 | 52.5 | 8 | 60 | | | | | |
| CP-2 20% aqueous solution | | | | | | | | 25.0 | | | | |
| CP-3 20% | | | | | | | | | 25.0 | | | |

TABLE 2-1-continued

| | Pigment dispersion | | | | | | | | | | | |
|---|---|---|---|---|---|---|---|---|---|---|---|---|
| | PD-1 | PD-2 | PD-3 | PD-4 | PD-5 | PD-6 | PD-7 | PD-8 | PD-9 | PD-10 | PD-11 | PD-12 |
| aqueous solution | | | | | | | | | | | | |
| CP-4 20% aqueous solution | | | | | | | | | | 25.0 | | |
| CP-5 20% aqueous solution | | | | | | | | | | | 25.0 | |
| CP-6 20% aqueous solution | | | | | | | | | | | | 25.0 |
| CP-7 20% aqueous solution | | | | | | | | | | | | |
| CP-8 20% aqueous solution | | | | | | | | | | | | |
| CP-9 20% aqueous solution | | | | | | | | | | | | |
| CP-10 20% aqueous solution | | | | | | | | | | | | |
| CP-11 20% aqueous solution | | | | | | | | | | | | |
| CP-12 20% aqueous solution | | | | | | | | | | | | |
| CP-13 20% aqueous solution | | | | | | | | | | | | |
| CP-14 20% aqueous solution | | | | | | | | | | | | |
| CP-15 20% aqueous solution | | | | | | | | | | | | |
| RCP-1 20% aqueous solution | | | | | | | | | | | | |
| Pigment Yellow 74 (acid value: 11 μmol/g) | 20.0 | 20.0 | 20.0 | 20.0 | 20.0 | 20.0 | 20.0 | 20.0 | 20.0 | 20.0 | 20.0 | 20.0 |
| Pigment Yellow 74 (acid value: 17 μmol/g) | | | | | | | | | | | | |
| Pigment Yellow 74 (acid value: 25 μmol/g) | | | | | | | | | | | | |
| Ion-exchanged water | balance | balance | balance | balance | balance | balance | balance | balance | balance | balance | balance | balance |
| Total | 100.0 | 100.0 | 100.0 | 100.0 | 100.0 | 100.0 | 100.0 | 100.0 | 100.0 | 100.0 | 100.0 | 100.0 |

TABLE 2-2

| | Pigment dispersion | | | | | | | | | | | |
|---|---|---|---|---|---|---|---|---|---|---|---|---|
| | PD-13 | PD-14 | PD-15 | PD-16 | PD-17 | PD-18 | PD-19 | PD-20 | PD-21 | RPD-1 | RPD-2 | RPD-3 |
| CP-1 20% aqueous solution | | | | | | | | | | | 25.0 | 25.0 |
| CP-2 20% aqueous solution | | | | | | | | | | | | |
| CP-3 20% aqueous solution | | | | | | | | | | | | |
| CP-4 20% aqueous solution | | | | | | | | | | | | |
| CP-5 20% aqueous solution | | | | | | | | | | | | |
| CP-6 20% aqueous solution | | | | | | | | | | | | |
| CP-7 20% aqueous solution | 25.0 | | | | | | | | | | | |
| CP-8 20% aqueous solution | | 25.0 | | | | | | | | | | |
| CP-9 20% aqueous solution | | | 25.0 | | | | | | | | | |
| CP-10 20% aqueous solution | | | | 25.0 | | | | | | | | |
| CP-11 20% aqueous solution | | | | | 25.0 | | | | | | | |

TABLE 2-2-continued

| | Pigment dispersion | | | | | | | | | | | |
|---|---|---|---|---|---|---|---|---|---|---|---|---|
| | PD-13 | PD-14 | PD-15 | PD-16 | PD-17 | PD-18 | PD-19 | PD-20 | PD-21 | RPD-1 | RPD-2 | RPD-3 |
| CP-12 20% aqueous solution | | | | | | 25.0 | | | | | | |
| CP-13 20% aqueous solution | | | | | | | 25.0 | | | | | |
| CP-14 20% aqueous solution | | | | | | | | 25.0 | | | | |
| CP-15 20% aqueous solution | | | | | | | | | 25.0 | | | |
| RCP-1 20% aqueous solution | | | | | | | | | | 25.0 | | |
| Pigment Yellow 74 (acid value: 11 μmol/g) | 20.0 | 20.0 | 20.0 | 20.0 | 20.0 | 20.0 | 20.0 | 20.0 | 20.0 | 20.0 | | |
| Pigment Yellow 74 (acid value: 17 μmol/g) | | | | | | | | | | | 20.0 | |
| Pigment Yellow 74 (acid value: 25 μmol/g) | | | | | | | | | | | | 20.0 |
| Ion-exchanged water | balance | balance | balance | balance | balance | balance | balance | balance | balance | balance | balance | balance |
| Total | 100.0 | 100.0 | 100.0 | 100.0 | 100.0 | 100.0 | 100.0 | 100.0 | 100.0 | 100.0 | 100.0 | 100.0 |

TABLE 3-1

| | | | Copolymer/ pigment | Example INK NO. | | | | | | |
|---|---|---|---|---|---|---|---|---|---|---|
| | Material name | Resin | mass ratio | 1 | 2 | 3 | 4 | 5 | 6 | 7 |
| Colorant | PD-1 | CP-1 | 0.25 | 25.0 | | | | | | |
| | PD-2 | CP-1 | 0.15 | | 25.0 | | | | | |
| | PD-3 | CP-1 | 0.54 | | | 25.0 | | | | |
| | PD-4 | CP-1 | 0.13 | | | | 25.0 | | | |
| | PD-5 | CP-1 | 0.53 | | | | | 25.0 | | |
| | PD-6 | CP-1 | 0.08 | | | | | | 25.0 | |
| | PD-7 | CP-1 | 0.6 | | | | | | | 25.0 |
| | PD-8 | CP-2 | 0.25 | | | | | | | |
| | PD-9 | CP-3 | 0.25 | | | | | | | |
| | PD-10 | CP-4 | 0.25 | | | | | | | |
| | PD-11 | CP-5 | 0.25 | | | | | | | |
| | PD-12 | CP-6 | 0.25 | | | | | | | |
| | PD-13 | CP-7 | 0.25 | | | | | | | |
| | PD-14 | CP-8 | 0.25 | | | | | | | |
| | PD-15 | CP-9 | 0.25 | | | | | | | |
| | PD-16 | CP-10 | 0.25 | | | | | | | |
| | PD-17 | CP-11 | 0.25 | | | | | | | |
| | PD-18 | CP-12 | 0.25 | | | | | | | |
| | PD-19 | CP-13 | 0.25 | | | | | | | |
| | PD-20 | CP-14 | 0.25 | | | | | | | |
| | PD-21 | CP-15 | 0.25 | | | | | | | |
| | RPD-1 | RCP-1 | 0.25 | | | | | | | |
| | RPD-2 | CP-1 | 0.25 | | | | | | | |
| | RPD-3 | CP-1 | 0.25 | | | | | | | |
| Water-soluble organic solvent, SP value in parentheses | Tripropylene glycol dimethyl ether (8.1) | | | | | | | | | |
| | Triethylene glycol monobutyl ether (10.2) | | | 40.0 | 40.0 | 40.0 | 40.0 | 40.0 | 40.0 | 40.0 |
| | 3-ethyl-3-hydroxymethyl oxetane (10.7) | | | | | | | | | |
| | Ethylene glycol (14.2) | | | | | | | | | |
| Surfactant | ZONYL FS-300 | | | 1.0 | 1.0 | 1.0 | 1.0 | 1.0 | 1.0 | 1.0 |
| Solvent | Ion-exchanged water | | | balance | balance | balance | balance | balance | balance | balance |
| | Total | | | 100.0 | 100.0 | 100.0 | 100.0 | 100.0 | 100.0 | 100.0 |

TABLE 3-2

| | Material name | Resin | Copolymer/pigment mass ratio | Example INK NO. 8 | 9 | 10 | 11 | 12 | 13 | 14 |
|---|---|---|---|---|---|---|---|---|---|---|
| Colorant | PD-1 | CP-1 | 0.25 | | | | | | | |
| | PD-2 | CP-1 | 0.15 | | | | | | | |
| | PD-3 | CP-1 | 0.54 | | | | | | | |
| | PD-4 | CP-1 | 0.13 | | | | | | | |
| | PD-5 | CP-1 | 0.53 | | | | | | | |
| | PD-6 | CP-1 | 0.08 | | | | | | | |
| | PD-7 | CP-1 | 0.6 | | | | | | | |
| | PD-8 | CP-2 | 0.25 | 25.0 | | | | | | |
| | PD-9 | CP-3 | 0.25 | | 25.0 | | | | | |
| | PD-10 | CP-4 | 0.25 | | | 25.0 | | | | |
| | PD-11 | CP-5 | 0.25 | | | | 25.0 | | | |
| | PD-12 | CP-6 | 0.25 | | | | | 25.0 | | |
| | PD-13 | CP-7 | 0.25 | | | | | | 25.0 | |
| | PD-14 | CP-8 | 0.25 | | | | | | | 25.0 |
| | PD-15 | CP-9 | 0.25 | | | | | | | |
| | PD-16 | CP-10 | 0.25 | | | | | | | |
| | PD-17 | CP-11 | 0.25 | | | | | | | |
| | PD-18 | CP-12 | 0.25 | | | | | | | |
| | PD-19 | CP-13 | 0.25 | | | | | | | |
| | PD-20 | CP-14 | 0.25 | | | | | | | |
| | PD-21 | CP-15 | 0.25 | | | | | | | |
| | RPD-1 | RCP-1 | 0.25 | | | | | | | |
| | RPD-2 | CP-1 | 0.25 | | | | | | | |
| | RPD-3 | CP-1 | 0.25 | | | | | | | |
| Water-soluble organic solvent, SP value in parentheses | Tripropylene glycol dimethyl ether (8.1) | | | | | | | | | |
| | Triethylene glycol monobutyl ether (10.2) | | | 40.0 | 40.0 | 40.0 | 40.0 | 40.0 | 40.0 | 40.0 |
| | 3-ethyl-3-hydroxymethyl oxetane (10.7) | | | | | | | | | |
| | Ethylene glycol (14.2) | | | | | | | | | |
| Surfactant | ZONYL FS-300 | | | 1.0 | 1.0 | 1.0 | 1.0 | 1.0 | 1.0 | 1.0 |
| Solvent | Ion-exchanged water | | | balance | balance | balance | balance | balance | balance | balance |
| | Total | | | 100.0 | 100.0 | 100.0 | 100.0 | 100.0 | 100.0 | 100.0 |

TABLE 3-3

| | Material name | Resin | Copolymer/pigment mass ratio | Example INK NO. 15 | 16 | 17 | 18 | 19 | 20 | 21 |
|---|---|---|---|---|---|---|---|---|---|---|
| Colorant | PD-1 | CP-1 | 0.25 | | | 25.0 | 25.0 | 25.0 | | |
| | PD-2 | CP-1 | 0.15 | | | | | | | |
| | PD-3 | CP-1 | 0.54 | | | | | | | |
| | PD-4 | CP-1 | 0.13 | | | | | | | |
| | PD-5 | CP-1 | 0.53 | | | | | | | |
| | PD-6 | CP-1 | 0.08 | | | | | | | |
| | PD-7 | CP-1 | 0.6 | | | | | | | |
| | PD-8 | CP-2 | 0.25 | | | | | | | |
| | PD-9 | CP-3 | 0.25 | | | | | | | |
| | PD-10 | CP-4 | 0.25 | | | | | | | |
| | PD-11 | CP-5 | 0.25 | | | | | | | |
| | PD-12 | CP-6 | 0.25 | | | | | | | |
| | PD-13 | CP-7 | 0.25 | | | | | | | |
| | PD-14 | CP-8 | 0.25 | | | | | | | |
| | PD-15 | CP-9 | 0.25 | 25.0 | | | | | | |
| | PD-16 | CP-10 | 0.25 | | 25.0 | | | | | |
| | PD-17 | CP-11 | 0.25 | | | | | | 25.0 | |
| | PD-18 | CP-12 | 0.25 | | | | | | | 25.0 |
| | PD-19 | CP-13 | 0.25 | | | | | | | |
| | PD-20 | CP-14 | 0.25 | | | | | | | |
| | PD-21 | CP-15 | 0.25 | | | | | | | |
| | RPD-1 | RCP-1 | 0.25 | | | | | | | |
| | RPD-2 | CP-1 | 0.25 | | | | | | | |
| | RPD-3 | CP-1 | 0.25 | | | | | | | |

TABLE 3-3-continued

| | Material name | Resin | Copolymer/ pigment mass ratio | Example INK NO. 15 | 16 | 17 | 18 | 19 | 20 | 21 |
|---|---|---|---|---|---|---|---|---|---|---|
| Water-soluble organic solvent, SP value in parentheses | Tripropylene glycol dimethyl ether (8.1) | | | | | 40.0 | | | | |
| | Triethylene glycol monobutyl ether (10.2) | | | 40.0 | 40.0 | | | | 40.0 | 40.0 |
| | 3-ethyl-3-hydroxymethyl oxetane (10.7) | | | | | | 40.0 | | | |
| | Ethylene glycol (14.2) | | | | | | | 40.0 | | |
| Surfactant | ZONYL FS-300 | | | 1.0 | 1.0 | 1.0 | 1.0 | 1.0 | 1.0 | 1.0 |
| Solvent | Ion-exchanged water | | | balance | balance | balance | balance | balance | balance | balance |
| | Total | | | 100.0 | 100.0 | 100.0 | 100.0 | 100.0 | 100.0 | 100.0 |

TABLE 3-4

| | Material name | Resin | Copolymer/ pigment mass ratio | Example INK NO. 22 | 23 | 24 | Comparative Example RINK NO. 1 | 2 | 3 |
|---|---|---|---|---|---|---|---|---|---|
| Colorant | PD-1 | CP-1 | 0.25 | | | | | | |
| | PD-2 | CP-1 | 0.15 | | | | | | |
| | PD-3 | CP-1 | 0.54 | | | | | | |
| | PD-4 | CP-1 | 0.13 | | | | | | |
| | PD-5 | CP-1 | 0.53 | | | | | | |
| | PD-6 | CP-1 | 0.08 | | | | | | |
| | PD-7 | CP-1 | 0.6 | | | | | | |
| | PD-8 | CP-2 | 0.25 | | | | | | |
| | PD-9 | CP-3 | 0.25 | | | | | | |
| | PD-10 | CP-4 | 0.25 | | | | | | |
| | PD-11 | CP-5 | 0.25 | | | | | | |
| | PD-12 | CP-6 | 0.25 | | | | | | |
| | PD-13 | CP-7 | 0.25 | | | | | | |
| | PD-14 | CP-8 | 0.25 | | | | | | |
| | PD-15 | CP-9 | 0.25 | | | | | | |
| | PD-16 | CP-10 | 0.25 | | | | | | |
| | PD-17 | CP-11 | 0.25 | | | | | | |
| | PD-18 | CP-12 | 0.25 | | | | | | |
| | PD-19 | CP-13 | 0.25 | 25.0 | | | | | |
| | PD-20 | CP-14 | 0.25 | | 25.0 | | | | |
| | PD-21 | CP-15 | 0.25 | | | 25.0 | | | |
| | RPD-1 | RCP-1 | 0.25 | | | | 25.0 | | |
| | RPD-2 | CP-1 | 0.25 | | | | | 25.0 | |
| | RPD-3 | CP-1 | 0.25 | | | | | | 25.0 |
| Water-soluble organic solvent, SP value in parentheses | Tripropylene glycol dimethyl ether (8.1) | | | | | | | | |
| | Triethylene glycol monobutyl ether (10.2) | | | 40.0 | 40.0 | 40.0 | 40.0 | 40.0 | 40.0 |
| | 3-ethyl-3-hydroxymethyl oxetane (10.7) | | | | | | | | |
| | Ethylene glycol (14.2) | | | | | | | | |
| Surfactant | ZONYL FS-300 | | | 1.0 | 1.0 | 1.0 | 1.0 | 1.0 | 1.0 |
| Solvent | Ion-exchanged water | | | balance | balance | balance | balance | balance | balance |
| | Total | | | 100.0 | 100.0 | 100.0 | 100.0 | 100.0 | 100.0 |

<Storage Stability of Pigment Dispersion>

Each pigment dispersion was filled in a glass container and stored at 70° C. for 1 week. A change rate of a pigment particle diameter (cumulative 90% particle diameter (D90)) after storage to a pigment particle diameter (cumulative 90% particle diameter (D90)) before storage was calculated according to the formula below and evaluated according to the criteria described below.

-continued $$D90\text{ change rate}(\%) = \frac{D90\text{ particle diameter(nm) after storage at }70^\circ\text{ C.} - D90\text{ particle diameter(nm) before storage at }70^\circ\text{ C.}}{D90\text{ particle diameter (nm) before storage at }70^\circ\text{ C.}} \times 100$$

The pigment particle diameter was measured with MICROTRAC NANOTRAC WAVE-UT151 (available from Nikkiso Co., Ltd.) at 23° C.

[Evaluation Criteria]

AA: The D90 change rate was within ±3%.

A: The D90 change rate was outside ±3% but within ±5%.

B: The D90 change rate was outside ±5% but within ±10%.

C: The D90 change rate was outside ±10% but within ±20%.

D: The D90 change rate was outside ±20% but within ±30%.

E: The D90 change rate was outside ±30% (unevaluable).

<Storage Stability of Ink>

Each ink was filled in an ink cartridge and stored at 70° C. for 1 week. In the same manner as in the case of the pigment dispersion, cumulative 90% (D90) values of the solid content of the ink before and after storage were measured.

It is preferable that a change rate of the cumulative 90% (D90) particle diameter of the solid content of the ink before and after storage at 70° C. for 1 week be 5% or less.

The pigment particle diameter was measured with MICROTRAC NANOTRAC WAVE-UT151 (available from Nikkiso Co., Ltd.) at 23° C.

<Discharging Stability>

With an inkjet printer (IPSIO GX-E5500 (available from Ricoh Company, Ltd.)) in which each of the inks was filled and set, continuous printing was performed for 10 minutes. Then, the printer was left to stand in an environment in which a temperature was 50° C. and a humidity was 60% RH for 1 month with a surface of a head capped for moisture retention in a state that the ink adhered to the surface of the head. After this, the printer was cleaned and restored to the same state as before the printer was left to stand. After this, an intermittent printing test was performed under conditions described below to evaluate discharging stability.

That is, a print pattern chart was printed on 20 sheets continuously, and then the printer was brought into a suspension state in which no printing was performed for 20 minutes. This process was repeated 50 times to print a total of 1,000 sheets. After this, the same chart was printed on one more sheet. Presence or absence of streak, white void, and jetting disorder on a 5% chart solid portion of the sheet was visually evaluated according to the criteria described below. In the print pattern chart, a print area of each color was 5% of the whole area of the sheet surface, and each ink was printed at a 100% duty. Printing conditions include a print density of 600×300 dpi and one-pass printing.

[Evaluation Criteria]

A: There were no streak, white void, and jetting disorder on the solid portion.

B: Streak, white void, and jetting disorder were slightly recognized on the solid portion.

C: Streak, white void, and jetting disorder were recognized on the solid portion.

D: Streak, white void, and jetting disorder were recognized all over the solid portion.

TABLE 4

| | Evaluation results | | |
|---|---|---|---|
| | | Ink | |
| | Storage stability of pigment dispersion | Storage stability | Discharging stability |
| Ex. 1 | AA | AA | A |
| Ex. 2 | A | AA | A |
| Ex. 3 | AA | AA | B |
| Ex. 4 | B | A | A |
| Ex. 5 | A | AA | B |
| Ex. 6 | B | B | B |
| Ex. 7 | B | B | B |

TABLE 4-continued

| | Evaluation results | | |
|---|---|---|---|
| | | Ink | |
| | Storage stability of pigment dispersion | Storage stability | Discharging stability |
| Ex. 8 | AA | A | A |
| Ex. 9 | A | A | B |
| Ex. 10 | A | AA | A |
| Ex. 11 | A | AA | A |
| Ex. 12 | A | A | B |
| Ex. 13 | A | A | A |
| Ex. 14 | AA | A | B |
| Ex. 15 | A | A | B |
| Ex. 16 | A | A | A |
| Ex. 17 | AA | A | A |
| Ex. 18 | AA | A | A |
| Ex. 19 | AA | AA | A |
| Ex. 20 | AA | AA | A |
| Ex. 21 | A | AA | A |
| Ex. 22 | A | A | A |
| Ex. 23 | AA | A | B |
| Ex. 24 | A | A | B |
| Comp. Ex. 1 | D | E | C |
| Comp. Ex. 2 | A | C | B |
| Comp. Ex. 3 | A | D | C |

What is claimed is:

1. An ink comprising:

a copolymer that comprises at least one of a structural unit represented by formula (1) below and a structural unit represented by formula (2) below;

a pigment having an acid value of 15 μmol/g or less and represented by formula (3) below;

water; and a water-soluble organic solvent, formula (1)

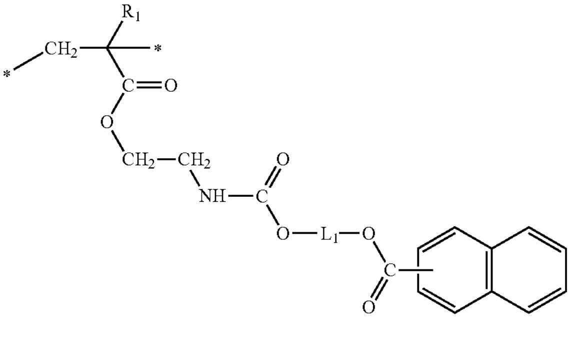

wherein in the formula (1), $R_1$ represents a hydrogen atom or a methyl group and $L_1$ represents an alkylene group that comprises from 2 through 18 carbon atoms, formula (2)

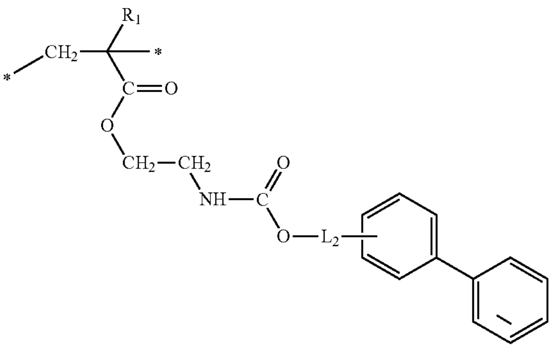

wherein in the formula (2), $R_1$ represents a hydrogen atom or a methyl group and $L_2$ represents a single bond or —$CH_2$)n-O— of which oxygen atom is bound with biphenyl, where n represents an integer of from 2 through 18, formula (3)

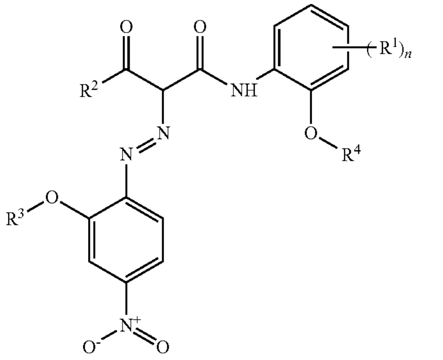

wherein in the formula (3), $R^1$ represents any one of a hydrogen atom, a halogen atom, an alkyl group that comprises from 1 through 4 carbon atoms, an alkoxy group that comprises from 1 through 4 carbon atoms, a hydroxy group, a nitro group, and an alkyl-substituted or unsubstituted amino group that comprises from 1 through 4 carbon atoms, n represents an integer of from 1 through 5, when n is a plural number, $R^1$may be identical or different, and $R^2$, $R^3$, and $R^4$ represent an alkyl group that comprises from 1 through 4 carbon atoms.

2. The ink according to claim 1, wherein the acid value of the pigment is 11 μmol/g or less.

3. The ink according to claim 1, wherein the pigment is Pigment Yellow 74.

4. The ink according to claim 1, wherein a mass ratio (copolymer/pigment) of the copolymer to the pigment is 0.10 or greater but 0.5 or less.

5. The ink according to claim 1, wherein the water-soluble organic solvent comprises a water-soluble organic solvent having a solubility parameter of 8.0 $(cal/cm^3)^{1/2}$ or greater but 15.0 $(cal/cm^3)^{1/2}$ or less.

6. The ink according to claim 1, wherein a change rate of a cumulative 90% (D90) particle diameter of a solid content of the ink before and after the ink is stored at 70° C. for 1 week is 5% or less.

7. The ink according to claim 1, wherein the copolymer further comprises a structural unit that comprises a nonionic group or an anionic group.

8. The ink according to claim 1, wherein $L_1$ in the formula (1) is an alkylene group that comprises from 2 through 12 carbon atoms.

9. The ink according to claim 1, wherein a weight average molecular weight Mw of the copolymer is 13,000 or greater but 40,000 or less.

10. An ink storage container comprising:

an ink; and a container storing the ink, wherein the ink comprises:

a copolymer that comprises at least one of a structural unit represented by formula (1) below and a structural unit represented by formula (2) below;

a pigment having an acid value of 15 μmolig or less and represented by formula (3) below;

water; and a water-soluble organic solvent, formula (1)

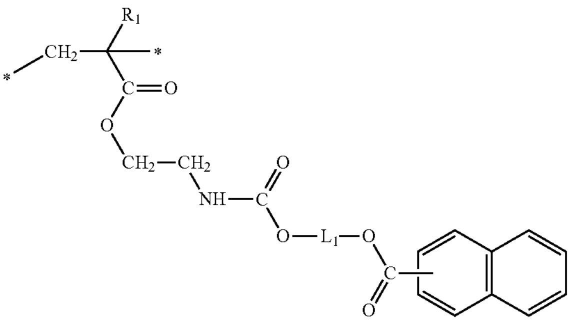

wherein in the formula (1), $R_1$ represents a hydrogen atom or a methyl group and $L_1$ represents an alkylene group that comprises from 2 through 18 carbon atoms, formula (2)

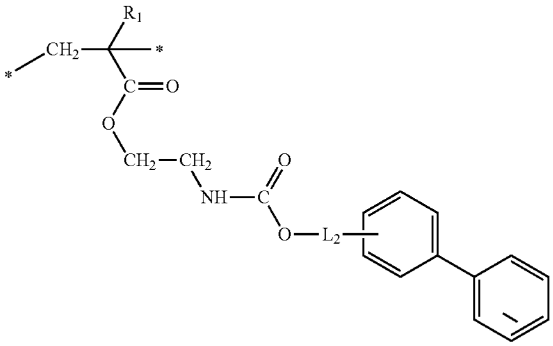

wherein in the formula (2), $R_1$ represents a hydrogen atom or a methyl group and $L_2$ represents a single bond or —(CH $_2$)n-O— of which oxygen atom is bound with biphenyl, where n represents an integer of from 2 through 18, formula (3)

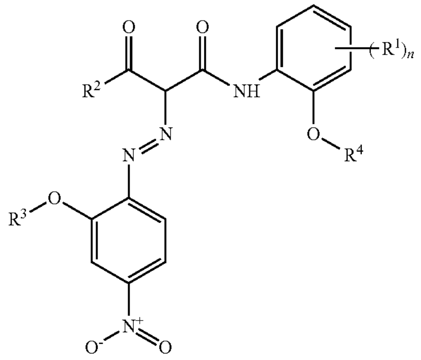

wherein in the formula (3), $R^1$ represents any one of a hydrogen atom, a halogen atom, an alkyl group that comprises from 1 through 4 carbon atoms, an alkoxy group that comprises from 1 through 4 carbon atoms, a hydroxy group, a nitro group, and an alkyl-substituted or unsubstituted amino group that comprises from 1 through 4 carbon atoms, n represents an integer of from 1 through 5, when n is a plural number, $R^1$ may be identical or different, and $R^2$, $R^3$, and $R^4$ represent an alkyl group that comprises from 1 through 4 carbon atoms.

11. An inkjet printing method comprising applying a stimulus to the ink according to claim 1 via an ink discharging unit to discharge the ink from a print head to print an image on a print medium.

12. An inkjet printing device comprising an ink discharging unit configured to discharge an ink from a print head to print an image on a print medium, wherein the ink comprises:

a copolymer that comprises at least one of a structural unit represented by formula (1) below and a structural unit represented by formula (2) below;

a pigment having an acid value of 15 μmolg or less and represented by formula (3) below;

water; and a water-soluble organic solvent, formula (1)

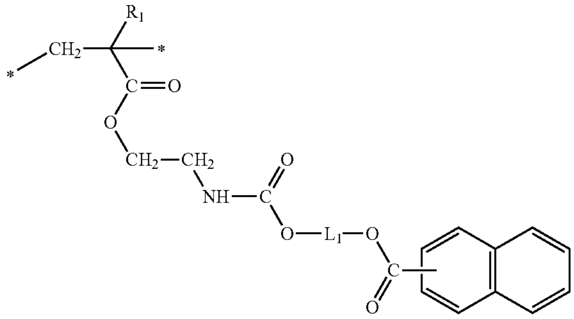

wherein in the formula (1), $R_1$ represents a hydrogen atom or a methyl group and $L_1$ represents an alkylene group that comprises from 2 through 18 carbon atoms, formula (2)

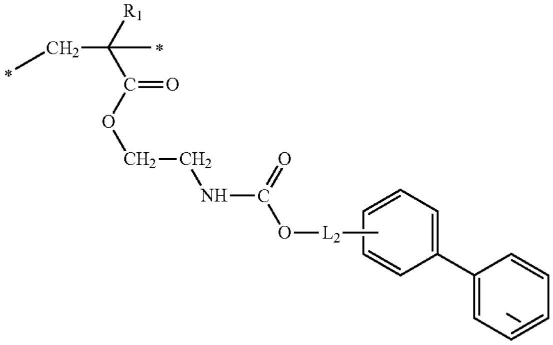

wherein in the formula (2), $R_1$ represents a hydrogen atom or a methyl group and $L_2$ represents a single bond or —(CH $_2$)n-O— of which oxygen atom is bound with biphenyl, where n represents an integer of from 2 through 18 , formula (3)

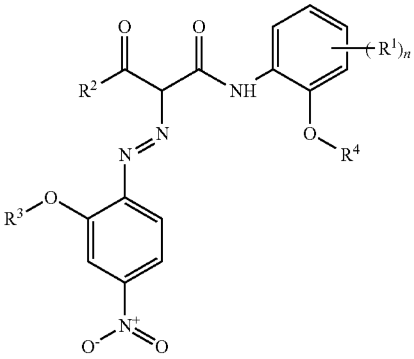

wherein in the formula (3 ), $R^1$ represents any one of a hydrogen atom, a halogen atom, an alkyl group that comprises from 1 through 4 carbon atoms, an alkoxy group that comprises from 1 through 4 carbon atoms, a hydroxy group, a nitro group, and an alkyl-substituted or unsubstituted amino group that comprises from 1 through 4 carbon atoms, n represents an integer of from 1 through 5, when n is a plural number, $R^1$ may be identical or different, and $R^2$, $R^3$, and $R^4$ represent an alkyl group that comprises from 1 through 4 carbon atoms.

13. The ink according to claim 1, wherein the copolymer comprises the structural unit represented by formula (1).

14. The ink according to claim 1, wherein the copolymer comprises the structural unit represented by formula (2).

15. The ink according to claim 1, wherein the copolymer comprises the structural unit represented by formula (1) and the structural unit represented by formula (2).

* * * * *